(12) United States Patent
Phillips et al.

(10) Patent No.: US 10,288,971 B2
(45) Date of Patent: May 14, 2019

(54) PHOTONIC-POWERED EC DEVICES

(71) Applicants: Roger W. Phillips, Santa Rosa, CA (US); Stephen C. Brown, San Mateo, CA (US)

(72) Inventors: Roger W. Phillips, Santa Rosa, CA (US); Stephen C. Brown, San Mateo, CA (US)

(73) Assignee: View, Inc., Milpitas, CA (US)

( * ) Notice: Subject to any disclaimer, the term of this patent is extended or adjusted under 35 U.S.C. 154(b) by 972 days.

(21) Appl. No.: 14/423,085

(22) PCT Filed: Aug. 23, 2013

(86) PCT No.: PCT/US2013/056506
§ 371 (c)(1),
(2) Date: Feb. 20, 2015

(87) PCT Pub. No.: WO2014/032023
PCT Pub. Date: Feb. 27, 2014

(65) Prior Publication Data
US 2015/0219975 A1  Aug. 6, 2015

Related U.S. Application Data

(60) Provisional application No. 61/692,634, filed on Aug. 23, 2012.

(51) Int. Cl.
*G02F 1/163* (2006.01)
*G02F 1/133* (2006.01)
(Continued)

(52) U.S. Cl.
CPC ............... *G02F 1/163* (2013.01); *E06B 9/24* (2013.01); *G02F 1/13306* (2013.01);
(Continued)

(58) Field of Classification Search
CPC ...... G02F 1/163; G02F 1/13306; G02F 1/161; G02F 2001/13324; H04B 10/807;
(Continued)

(56) References Cited

U.S. PATENT DOCUMENTS 253,392 A    2/1882  Jones et al.
2,121,753 A  6/1938  Cornell, Jr.
(Continued)

FOREIGN PATENT DOCUMENTS

CN    1380991 A    11/2002
CN    1822951 A    8/2006
(Continued)

OTHER PUBLICATIONS

U.S. Appl. No. 14/512,297, filed Oct. 10, 2014, entitled "Electrochromic Window Fabrication Methods", and preliminary amendment filed Oct. 10, 2014.
(Continued)

*Primary Examiner* — Collin X Beatty
*Assistant Examiner* — Grant A Gagnon
(74) *Attorney, Agent, or Firm* — Weaver Austin Villeneuve & Sampson LLP; Brian D. Griedel

(57) ABSTRACT

The embodiments herein relate to electrochromic window systems and components thereof. In particular, the disclosed embodiments relate to systems where electrochromic devices are powered and/or controlled using photonic energy. In an exemplary embodiment, a laser is driven by a driver to deliver photonic power and/or control information into an optical fiber. The optical fiber carries the power and control information to a photovoltaic converter and a controller. The photovoltaic converter and controller may be included within an insulated glass unit in some embodiments. The photovoltaic converter converts the light energy into electrical energy used to power a transition in an optical (Continued)

state of an electrochromic layer or layers within the insulated glass unit. The controller may be used to control the power delivered to the electrochromic layer(s), such that a smooth transition occurs. In some embodiments, control information may be transmitted in an upstream manner to communicate information regarding, for example, the state of an electrochromic device (e.g., current level of tinting, fault status, etc.).

33 Claims, 8 Drawing Sheets

(51) Int. Cl.
E06B 9/24 (2006.01)
G02F 1/161 (2006.01)
H04B 10/80 (2013.01)
E06B 3/663 (2006.01)
E06B 7/28 (2006.01)

(52) U.S. Cl.
CPC ............ *G02F 1/161* (2013.01); *H04B 10/807* (2013.01); *E06B 3/66314* (2013.01); *E06B 7/28* (2013.01); *E06B 2009/2464* (2013.01); *G02F 2001/13324* (2013.01); *Y02B 80/20* (2013.01)

(58) Field of Classification Search
CPC ....... Y02B 80/20; E06B 9/24; E06B 3/66314; E06B 7/28; E06B 2009/2464
USPC .......................................... 359/275
See application file for complete search history.

(56) References Cited

U.S. PATENT DOCUMENTS

| | | |
|---|---|---|
| 4,306,140 A | 12/1981 | Stromquist |
| 4,937,423 A | 6/1990 | Yoshihara et al. |
| 4,941,302 A | 7/1990 | Barry |
| 5,017,755 A | 5/1991 | Yahagi et al. |
| 5,076,673 A | 12/1991 | Lynam et al. |
| 5,124,833 A | 6/1992 | Barton et al. |
| 5,140,455 A | 8/1992 | Varaprasad et al. |
| 5,142,407 A | 8/1992 | Varaprasad et al. |
| 5,145,609 A | 9/1992 | Varaprasad et al. |
| 5,151,816 A | 9/1992 | Varaprasad et al. |
| 5,170,108 A | 12/1992 | Peterson et al. |
| 5,233,461 A | 8/1993 | Dornan et al. |
| 5,239,405 A | 8/1993 | Varaprasad et al. |
| 5,313,761 A | 5/1994 | Leopold |
| 5,340,503 A | 8/1994 | Varaprasad et al. |
| 5,379,146 A | 1/1995 | Defendini |
| 5,384,653 A | 1/1995 | Benson et al. |
| 5,471,338 A | 11/1995 | Yu et al. |
| 5,472,643 A | 12/1995 | Varaprasad et al. |
| 5,500,760 A | 3/1996 | Varaprasad et al. |
| 5,567,360 A | 10/1996 | Varaprasad et al. |
| 5,657,149 A | 8/1997 | Buffat et al. |
| 5,657,150 A | 8/1997 | Kallman et al. |
| 5,668,663 A | 9/1997 | Varaprasad et al. |
| 5,724,175 A | 3/1998 | Hichwa et al. |
| 5,724,187 A | 3/1998 | Varaprasad et al. |
| 5,805,330 A | 9/1998 | Byker et al. |
| 5,877,936 A | 3/1999 | Nishitani et al. |
| 5,948,195 A | 9/1999 | Thomas |
| 5,953,150 A | 9/1999 | Smarto et al. |
| 5,969,847 A | 10/1999 | Coleman et al. |
| 5,985,184 A | 11/1999 | Lynam |
| 5,995,271 A | 11/1999 | Zieba et al. |
| 6,001,487 A | 12/1999 | Ladang et al. |
| 6,002,511 A | 12/1999 | Varaprasad et al. |
| 6,039,390 A | 3/2000 | Agrawal et al. |
| 6,045,643 A | 4/2000 | Byker et al. |
| 6,045,896 A | 4/2000 | Boire et al. |
| 6,055,088 A | 4/2000 | Fix et al. |
| 6,055,089 A | 4/2000 | Schulz et al. |
| 6,068,720 A | 5/2000 | McHugh |
| 6,118,573 A | 9/2000 | Kubo et al. |
| 6,143,209 A | 11/2000 | Lynam |
| 6,154,306 A | 11/2000 | Varaprasad et al. |
| 6,166,849 A | 12/2000 | Coleman et al. |
| 6,176,715 B1 | 1/2001 | Buescher |
| 6,204,953 B1 | 3/2001 | Zieba et al. |
| 6,207,083 B1 | 3/2001 | Varaprasad et al. |
| 6,244,716 B1 | 6/2001 | Steenwyk et al. |
| 6,261,641 B1 | 7/2001 | Zieba et al. |
| 6,337,758 B1 | 1/2002 | Beteille et al. |
| 6,369,935 B1 | 4/2002 | Cardinal et al. |
| 6,407,847 B1 | 6/2002 | Poll et al. |
| 6,420,071 B1 | 7/2002 | Lee et al. |
| 6,433,913 B1 | 8/2002 | Bauer et al. |
| 6,515,787 B1 | 2/2003 | Westfall et al. |
| 6,529,308 B2 | 3/2003 | Beteille et al. |
| 6,535,126 B2 | 3/2003 | Lin et al. |
| 6,559,411 B2 | 5/2003 | Borgeson et al. |
| 6,561,460 B2 | 5/2003 | Rukavina et al. |
| 6,567,708 B1 | 5/2003 | Bechtel et al. |
| 6,783,099 B2 | 8/2004 | Rukavina et al. |
| 6,795,226 B2 | 9/2004 | Agrawal et al. |
| 6,822,778 B2 | 11/2004 | Westfall et al. |
| 6,853,472 B2 | 2/2005 | Warner et al. |
| 6,862,125 B2 | 3/2005 | Warner et al. |
| 6,897,936 B2 | 5/2005 | Li et al. |
| 6,919,530 B2 | 7/2005 | Borgeson et al. |
| 6,950,221 B1 | 9/2005 | Terada et al. |
| 6,995,891 B2 | 2/2006 | Agrawal et al. |
| 7,002,720 B2 | 2/2006 | Beteille et al. |
| 7,004,592 B2 | 2/2006 | Varaprasad et al. |
| 7,033,655 B2 | 4/2006 | Beteille et al. |
| 7,130,101 B2 | 10/2006 | Rukavina et al. |
| 7,133,181 B2 | 11/2006 | Greer |
| 7,173,750 B2 | 2/2007 | Rukavina |
| 7,202,987 B2 | 4/2007 | Varaprasad et al. |
| 7,230,748 B2 | 6/2007 | Giron et al. |
| 7,248,392 B2 | 7/2007 | Rukavina et al. |
| 7,259,730 B2 | 8/2007 | O'Keeffe |
| 7,277,215 B2 | 10/2007 | Greer |
| 7,300,166 B2 | 11/2007 | Agrawal et al. |
| 7,317,106 B2 | 1/2008 | Warner et al. |
| 7,324,261 B2 | 1/2008 | Tonar et al. |
| 7,362,491 B2 | 4/2008 | Busick et al. |
| 7,531,101 B2 | 5/2009 | Beteille |
| 7,586,664 B2 | 9/2009 | O'Shaughnessy et al. |
| 7,710,671 B1 | 5/2010 | Kwak et al. |
| 7,719,751 B2 | 5/2010 | Egerton et al. |
| 7,869,114 B2 | 1/2011 | Valentin et al. |
| 7,894,119 B2 | 2/2011 | Valentin et al. |
| 7,929,194 B2 | 4/2011 | Legois et al. |
| 7,941,982 B2 | 5/2011 | Merica |
| 8,035,882 B2 | 10/2011 | Fanton et al. |
| 8,213,074 B1 | 7/2012 | Shrivastava et al. |
| 8,254,013 B2 | 8/2012 | Mehtani et al. |
| 8,643,933 B2 | 2/2014 | Brown et al. |
| 8,669,503 B2 | 3/2014 | Johnson et al. |
| 8,711,465 B2 | 4/2014 | Bhatnagar et al. |
| 8,800,221 B1 | 8/2014 | Header |
| 8,810,889 B2 | 8/2014 | Brown et al. |
| 8,976,440 B2 | 3/2015 | Berland et al. |
| 9,019,588 B2 | 4/2015 | Brown et al. |
| 9,081,246 B2 | 7/2015 | Rozbicki |
| 9,170,008 B2 | 10/2015 | Reul et al. |
| 9,250,494 B2 | 2/2016 | Podbelski et al. |
| 9,436,054 B2 | 9/2016 | Brown et al. |
| 9,482,922 B2 | 11/2016 | Brown et al. |
| 9,618,820 B2 | 4/2017 | Conklin et al. |
| 9,671,665 B2 | 6/2017 | Brown et al. |
| 9,690,162 B2 | 6/2017 | Brown et al. |
| 9,728,920 B2 | 8/2017 | Brown et al. |
| 9,769,459 B2 * | 9/2017 | Thompson ......... H04N 13/0253 |
| 10,139,696 B2 | 11/2018 | Brown et al. |
| 10,139,697 B2 | 11/2018 | Wilbur et al. |
| 2002/0041443 A1 | 4/2002 | Varaprasad et al. |

(56) References Cited

U.S. PATENT DOCUMENTS

| | | |
|---|---|---|
| 2002/0075552 A1 | 6/2002 | Poll et al. |
| 2002/0135881 A1 | 9/2002 | Rukavina et al. |
| 2002/0181068 A1 | 12/2002 | Bonhote et al. |
| 2003/0111447 A1 | 6/2003 | Corkum et al. |
| 2003/0191546 A1 | 10/2003 | Bechtel et al. |
| 2003/0227663 A1 | 12/2003 | Agrawal et al. |
| 2004/0047050 A1 | 3/2004 | Bauer et al. |
| 2004/0208600 A1 | 10/2004 | Guenter et al. |
| 2004/0257633 A1 | 12/2004 | Agrawal et al. |
| 2005/0002081 A1 | 1/2005 | Beteille et al. |
| 2005/0166495 A1 | 8/2005 | Cho et al. |
| 2006/0077511 A1 | 4/2006 | Poll et al. |
| 2006/0107616 A1 | 5/2006 | Ratti et al. |
| 2006/0187608 A1 | 8/2006 | Stark |
| 2006/0283084 A1 | 12/2006 | Johnson |
| 2007/0002422 A1 | 1/2007 | O'Shaughnessy |
| 2007/0020442 A1 | 1/2007 | Giron et al. |
| 2007/0067048 A1 | 3/2007 | Bechtel et al. |
| 2007/0103761 A1 | 5/2007 | Giron et al. |
| 2007/0133078 A1 | 6/2007 | Fanton et al. |
| 2007/0236180 A1 | 10/2007 | Rodgers |
| 2007/0248756 A1 | 10/2007 | Krisko et al. |
| 2008/0074724 A1 | 3/2008 | Agrawal et al. |
| 2008/0239452 A1 | 10/2008 | Xu et al. |
| 2009/0016715 A1 | 1/2009 | Furey |
| 2009/0058295 A1 | 3/2009 | Auday et al. |
| 2009/0067031 A1 | 3/2009 | Piroux et al. |
| 2009/0095341 A1 | 4/2009 | Pfenninger et al. |
| 2009/0097098 A1 | 4/2009 | Piroux |
| 2009/0110918 A1 | 4/2009 | Jacquiod et al. |
| 2009/0114928 A1 | 5/2009 | Messere et al. |
| 2009/0130409 A1 | 5/2009 | Reutler et al. |
| 2009/0148642 A1 | 6/2009 | Mauser et al. |
| 2009/0153208 A1* | 6/2009 | Lynch .............. G02F 1/13306 327/175 |
| 2009/0157358 A1* | 6/2009 | Kim .................. G01L 1/16 702/185 |
| 2009/0174300 A1 | 7/2009 | Jousse et al. |
| 2009/0181203 A1 | 7/2009 | Valentin et al. |
| 2009/0251758 A1 | 10/2009 | Valentin et al. |
| 2009/0262411 A1 | 10/2009 | Karmhag et al. |
| 2009/0297806 A1 | 12/2009 | Dawson-Elli et al. |
| 2009/0323160 A1 | 12/2009 | Egerton et al. |
| 2009/0323162 A1 | 12/2009 | Fanton et al. |
| 2010/0208326 A1 | 8/2010 | Kwak et al. |
| 2010/0243427 A1 | 9/2010 | Kozlowski et al. |
| 2010/0245973 A1 | 9/2010 | Wang et al. |
| 2011/0043885 A1 | 2/2011 | Lamine et al. |
| 2011/0048614 A1 | 3/2011 | Veerasamy et al. |
| 2011/0051221 A1 | 3/2011 | Veerasamy |
| 2011/0059275 A1 | 3/2011 | Stark |
| 2011/0094585 A1 | 4/2011 | Debije et al. |
| 2011/0148218 A1 | 6/2011 | Rozbicki |
| 2011/0211247 A1 | 9/2011 | Kozlowski et al. |
| 2011/0216389 A1 | 9/2011 | Piroux et al. |
| 2011/0248014 A1 | 10/2011 | Chubb |
| 2011/0249314 A1 | 10/2011 | Wang et al. |
| 2011/0260961 A1 | 10/2011 | Burdis |
| 2011/0266137 A1 | 11/2011 | Wang et al. |
| 2011/0266138 A1 | 11/2011 | Wang et al. |
| 2011/0267672 A1 | 11/2011 | Sbar et al. |
| 2011/0267674 A1 | 11/2011 | Wang et al. |
| 2011/0267675 A1 | 11/2011 | Wang et al. |
| 2011/0279882 A1 | 11/2011 | Chan et al. |
| 2011/0292488 A1 | 12/2011 | McCarthy et al. |
| 2011/0299149 A1 | 12/2011 | Park et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0147449 A1 | 6/2012 | Bhatnagar et al. |
| 2012/0194895 A1 | 8/2012 | Podbelski et al. |
| 2012/0200908 A1 | 8/2012 | Bergh et al. |
| 2012/0239209 A1 | 9/2012 | Brown et al. |
| 2012/0268803 A1 | 10/2012 | Greer et al. |
| 2012/0293855 A1 | 11/2012 | Shrivastava |
| 2012/0300280 A1 | 11/2012 | Murphy et al. |
| 2012/0327499 A1 | 12/2012 | Parker et al. |
| 2013/0157493 A1 | 6/2013 | Brown |
| 2013/0241299 A1 | 9/2013 | Snyker et al. |
| 2013/0278988 A1 | 10/2013 | Jack et al. |
| 2013/0278989 A1 | 10/2013 | Lam et al. |
| 2013/0319756 A1 | 12/2013 | Snyker et al. |
| 2013/0333693 A1 | 12/2013 | Hashimura et al. |
| 2014/0000191 A1 | 1/2014 | Snyker et al. |
| 2014/0041933 A1 | 2/2014 | Snyker et al. |
| 2014/0160550 A1 | 6/2014 | Brown et al. |
| 2014/0170863 A1 | 6/2014 | Brown |
| 2014/0192393 A1 | 7/2014 | Bhatnagar et al. |
| 2014/0247475 A1 | 9/2014 | Parker et al. |
| 2014/0330538 A1 | 11/2014 | Conklin et al. |
| 2014/0349497 A1 | 11/2014 | Brown et al. |
| 2014/0355097 A1 | 12/2014 | Brown et al. |
| 2015/0092260 A1 | 4/2015 | Parker et al. |
| 2015/0103389 A1 | 4/2015 | Klawuhn et al. |
| 2015/0118869 A1 | 4/2015 | Brown et al. |
| 2015/0122325 A1 | 5/2015 | Park et al. |
| 2015/0378231 A1 | 12/2015 | Greer et al. |
| 2016/0085130 A1 | 3/2016 | Timofejevs et al. |
| 2016/0154290 A1 | 6/2016 | Brown et al. |
| 2016/0197220 A1 | 7/2016 | Greer et al. |
| 2016/0197576 A1 | 7/2016 | Taylor et al. |
| 2016/0344148 A1 | 11/2016 | Mullins et al. |
| 2016/0357083 A1 | 12/2016 | Brown et al. |
| 2017/0045795 A1 | 2/2017 | Brown et al. |
| 2017/0052753 A1 | 2/2017 | Paolini, Jr. |
| 2017/0117674 A1 | 4/2017 | Brown et al. |
| 2017/0219908 A1 | 8/2017 | Brown et al. |
| 2017/0250163 A1 | 8/2017 | Wilbur et al. |
| 2018/0175313 A1 | 6/2018 | Loo et al. |
| 2018/0301578 A1 | 10/2018 | Rozbicki |
| 2018/0301858 A9 | 10/2018 | Mullins et al. |
| 2018/0314100 A1 | 11/2018 | Mullins et al. |

FOREIGN PATENT DOCUMENTS

| | | |
|---|---|---|
| CN | 202108407 U | 1/2012 |
| CN | 205743507 U | 11/2016 |
| DE | 102006042538 | 3/2008 |
| EP | 2136409 | 12/2009 |
| EP | 2348357 | 7/2011 |
| EP | 2357544 | 8/2011 |
| EP | 2648086 A2 | 10/2013 |
| EP | 2764998 A1 | 8/2014 |
| GB | 1437198 | 5/1976 |
| JP | 2000-257352 A | 9/2000 |
| JP | 2001-193364 | 7/2001 |
| JP | 2004-504630 A | 12/2004 |
| JP | 2007-516147 A | 6/2007 |
| JP | 2009-544997 A | 12/2009 |
| TW | 526383 B | 4/2003 |
| WO | WO2002/008826 A1 | 1/2002 |
| WO | WO2005/076061 | 8/2005 |
| WO | WO2006/133298 A2 | 12/2006 |
| WO | WO2006/133298 A3 | 12/2007 |
| WO | WO2008/043951 | 4/2008 |
| WO | WO2009/097001 A1 | 8/2009 |
| WO | WO2009/145876 | 12/2009 |
| WO | WO2009/148861 | 12/2009 |
| WO | WO2010/077409 A2 | 7/2010 |
| WO | WO2011/010067 | 1/2011 |
| WO | WO2011/028253 | 3/2011 |
| WO | WO2011/028254 | 3/2011 |
| WO | WO2011/050291 | 4/2011 |
| WO | WO2011/109688 | 9/2011 |
| WO | WO2012/079159 | 6/2012 |
| WO | WO2012/145155 | 10/2012 |
| WO | WO2013/090264 | 6/2013 |
| WO | WO2013/109881 | 7/2013 |
| WO | WO2013/177575 | 11/2013 |
| WO | WO2014/032023 | 2/2014 |
| WO | WO2014/082092 | 5/2014 |
| WO | WO2014/121809 | 8/2014 |
| WO | WO2014/169253 | 10/2014 |
| WO | WO2015/024045 A1 | 2/2015 |

(56) References Cited

FOREIGN PATENT DOCUMENTS

| WO | WO2015/051262 A1 | 4/2015 |
|---|---|---|
| WO | WO2015/120063 | 8/2015 |
| WO | WO2016/004109 A1 | 1/2016 |
| WO | WO2016/126693 A1 | 8/2016 |
| WO | WO2018/019473 A1 | 2/2018 |
| WO | WO2018/152249 | 8/2018 |

OTHER PUBLICATIONS

U.S. Appl. No. 14/325,290, filed Jan. 7, 2015.
Office Action dated Nov. 3, 2014 for U.S. Appl. No. 13/456,056.
Office Action dated Oct. 6, 2014 for U.S. Appl. No. 13/968,258.
Office Action dated Jul. 11, 2013 for U.S. Appl. No. 13/312,057.
Office Action dated Jan. 30, 2015 for U.S. Appl. No. 14/152,873.
Notice of Allowance dated Sep. 18, 2013 for U.S. Appl. No. 13/326,168.
Notice of Allowance dated Dec. 13, 2013 for U.S. Appl. No. 13/312,057.
Notice of Allowance dated Jun. 13, 2014 for U.S. Appl. No. 14/103,660, and allowed claims.
Notice of Allowance dated Oct. 9, 2014 for U.S. Appl. No. 14/325,290.
International Search Report and Written Opinion dated Jul. 23, 2012, from PCT/US2011/063534.
International Preliminary Report on Patentability dated Jun. 20, 2013, from PCT/US2011/063534.
International Search Report and Written Opinion dated Apr. 1, 2013 from PCT/US2012/068950.
International Preliminary Report on Patentability dated Jun. 26, 2014 from PCT/US2012/068950.
International Search Report and Written Opinion dated Aug. 12, 2013 for PCT/US2013/037644.
International Preliminary Report on Patentability dated Jun. 11, 2014 for PCT/US2013/037644.
International Search Report and Written Opinion dated Nov. 22, 2013 for PCT/US2013/056506.
International Search Report and Written Opinion dated Aug. 19, 2014 for PCT/US2014/033870.
Office Action dated Nov. 4, 2013 for EP Application No. 11846667.1.
European Search Report dated Mar. 3, 2014 for EP Application No. 11846667.1.
Ernst, Randi, "Gas Filling of IG Units" by FDR Design, Inc. (undated), 37 pages.
Partial European Search Report dated Mar. 21, 2016 for EP Application No. 13830992.7.
International Preliminary Report on Patentability dated Mar. 5, 2015 for PCT/US2013/056506.
Armstrong, Dave, "Smart, energetic glass could take over" in *Earth Times*, [http://www.earthtimes.org/energy/smart-energetic-glass-take-over/2866/] Apr. 12, 2015.
"'Smart glass' changes colour and produces electricity", ZeeNewsIndia.com [http://zeenews.india.com/news/sci-tech/smart-glass-changes-colour-and-produces-electricity_1577561.html] Apr. 12, 2015.
U.S. Office Action dated Sep. 11, 2017 in U.S. Appl. No. 14/951,410.
U.S. Final Office Action dated Mar. 15, 2018 in U.S. Appl. No. 14/951,410.
Extended European Search Report dated Jul. 15, 2016 for EP Application No. 13830992.7.
European Office Action dated Dec. 8, 2017 in EP Application No. 13830992.7.
International Search Report and Written Opinion dated Dec. 20, 2016 for PCT/US2016/059498.
International Search Report and Written Opinion dated Feb. 15, 2016 in PCT/US2015/062480.
International Preliminary Report on Patentability dated Jun. 8, 2017 in PCT/US2015/062480.
American Chemical Society, "Solar smart window could offer privacy and light control on demand (video)," EurakAlert! Pub Release, Nov. 16, 2016 [https://www.eurekalert.org/pub_releases/2016-11/acs-ssw111616.php].
"SageGlass Unplugged™—wireless dynamic glass", 2014, 2 pages.
"Ossia Wireless Charging", screenshot and picture of Cota device, accessed Apr. 20, 2015, 1 page.
"SageGlass Mobile App" screenshot, accessed Aug. 28, 2015, 1 page.
"Sage Product Highlights" screenshot, accessed Aug. 28, 2015, 1 page.
"SageGlass Unplugged" screenshot, accessed Aug. 28, 2015, 1 page.
Vinci Construction Datasheet for "Horizon-Solar Connected Window", Dec. 2016 (2 pp).
Preliminary Amendment filed Oct. 18, 2016 in U.S. Appl. No. 15/228,992.
Preliminary Amendment filed Jun. 22, 2017 for U.S. Appl. No. 15/493,003.
Preliminary Amendment filed Sep. 26, 2017 for U.S. Appl. No. 15/597,041.
U.S. Notice of Allowance dated Feb. 25, 2015 in U.S. Appl. No. 14/325,290.
U.S. Final Office Action dated Jun. 5, 2015 in U.S. Appl. No. 13/968,258.
U.S. Office Action dated Jan. 21, 2016 in U.S. Appl. No. 13/968,258.
U.S. Notice of Allowance dated Jun. 20, 2016 in U.S. Appl. No. 13/968,258.
U.S. Notice of Allowance dated May 19, 2015 in U.S. Appl. No. 14/152,873.
U.S. Office Action dated Mar. 31, 2015 in U.S. Appl. No. 14/196,895.
Office Action dated Feb. 4, 2015 for U.S. Appl. No. 14/591,851.
Final Office Action dated Sep. 11, 2015 for U.S. Appl. No. 14/591,851.
Notice of Allowance dated May 9, 2016 for U.S. Appl. No. 14/591,851.
Notice of Allowance (corrected) dated Jun. 30, 2016 for U.S. Appl. No. 14/591,851.
Notice of Allowance (2nd corrected) dated Aug. 9, 2016 for U.S. Appl. No. 14/591,851.
U.S. Notice of Allowance dated Feb. 15, 2017 for U.S. Appl. No. 15/217,873.
U.S. Notice of Allowance dated Mar. 28, 2018 for U.S. Appl. No. 15/597,041.
U.S. Office Action dated Jun. 27, 2016 for U.S. Appl. No. 14/363,769.
U.S. Notice of Allowance dated Nov. 18, 2016 for U.S. Appl. No. 14/363,769.
U.S. Notice of Allowability (Corrected) dated May 10, 2017 for U.S. Appl. No. 14/363,769.
U.S. Notice of Allowance dated Mar. 17, 2017 for U.S. Appl. No. 15/394,637.
U.S. Notice of Allowance dated Oct. 5, 2017 for U.S. Appl. No. 15/493,003.
U.S. Notice of Allowance dated Jan. 31, 2018 for U.S. Appl. No. 15/493,003.
U.S. Notice of Allowance dated Oct. 11, 2017 for U.S. Appl. No. 15/228,992.
U.S. Notice of Allowance dated Jan. 25, 2018 for U.S. Appl. No. 15/228,992.
U.S. Notice of Allowance dated Dec. 5, 2017 for U.S. Appl. No. 15/243,816.
U.S. Office Action dated Jul. 15, 2016 for U.S. Appl. No. 14/401,081.
U.S. Final Office Action dated Jan. 10, 2017 for U.S. Appl. No. 14/401,081.
U.S. Office Action dated May 4, 2017 for U.S. Appl. No. 14/401,081.
U.S. Final Office Action Sep. 25, 2017 for U.S. Appl. No. 14/401,081.
U.S. Office Action dated Mar. 8, 2018 for U.S. Appl. No. 14/401,081.
International Search Report and Written Opinion dated May 18, 2015 for PCT/US2015/014479.
International Preliminary Report on Patentability dated Aug. 9, 2016 for PCT/US2015/014479.
International Search Report and Written Opinion for PCT/2013/042765 dated Aug. 23, 2013.

(56) References Cited

OTHER PUBLICATIONS

International Preliminary Report on Patentability for PCT/2013/042765 dated Dec. 4, 2014.
European Search Report dated Apr. 2, 2015 for EP Application No. 12858168.3.
European Office Action dated Jul. 1, 2016 for EP Application No. 12858168.3.
European Office Action dated Mar. 13, 2017 for EP Application No. 12858168.3.
CN Office Action dated Jun. 3, 2015 in CN Application No. 201280069715.1.
CN Office Action dated Mar. 11, 2016 in CN Application No. 201280069715.1.
TW Office Action dated Oct. 28, 2016 in TW Application No. 101147237.
Boylestad, R., et al., "Electronic devices and circuit theory (7th Edition)," 1999, pp. 76-82.
McManis, C., "H-Bridges: theory and practice," Chuck's Robotics Notebook, 2004, 3 pp.
McWane, J., "Introduction to Electronics Technology (2nd Edition)," 1981, p. 12 & pp. 228-233.
Westinghouse User's Manual, "LD-325 Series," 2010, 67 pp.
U.S. Appl. No. 15/525,262, filed May 8, 2017, Rozbicki.
Preliminary Amendment filed Jun. 26, 2018 for U.S. Appl. No. 16/016,450.
U.S. Notice of Allowance dated Jul. 19, 2018 for U.S. Appl. No. 15/597,041.
U.S. Notice of Allowance dated Jul. 23, 2018 for U.S. Appl. No. 15/493,003.
U.S. Notice of Allowance dated May 23, 2018 for U.S. Appl. No. 15/228,992.
U.S. Notice of Allowance dated Oct. 3, 2018 for U.S. Appl. No. 15/228,992.
U.S. Notice of Allowance dated Apr. 11, 2018 for U.S. Appl. No. 15/243,816.
U.S. Notice of Allowance dated Aug. 23, 2018 for U.S. Appl. No. 15/243,816.
U.S. Final Office Action dated Jul. 5, 2018 for U.S. Appl. No. 14/401,081.
European Office Action dated Jul. 18, 2018 in EP Application No. 13830992.7.
CN Office Action dated Mar. 29, 2018 in CN Application No. 201610921855.7.
TW Office Action dated Aug. 23, 2018 in TW Application No. 106129194.
U.S. Notice of Allowance dated Oct. 22, 2018 in U.S. Appl. No. 14/951,410.
European Extended Search Report dated Nov. 8, 2018 in EP Application No. 15863112.7.
International Preliminary Report on Patentability dated May 11, 2018 for PCT/US2016/059498.
International Search Report and Written Opinion (ISA/KR) dated May 23, 2018 in PCT Application No. PCT/US2018/018241.
CN Office Action dated Aug. 28, 2018 in CN Application No. 201580070776.3.
"Velux" Skylights brochure, known as of Jan. 31, 2014, 4 pp.
U.S. Appl. No. 16/163,445, filed Oct. 17, 2018, Wilbur et al.
U.S. Appl. No. 16/168,720, filed Oct. 23, 2018, Brown et al.
Extended European Search Report dated Dec. 14, 2018 for EP Application No. 18194665.8.

* cited by examiner

PHOTONIC-POWERED EC DEVICES

CROSS REFERENCE TO RELATED APPLICATIONS

This application claims benefit of U.S. Provisional Application No. 61/692,634, filed Aug. 23, 2012, and titled "PHOTONIC-POWERED EC DEVICES", which is incorporated herein in its entirety and for all purposes.

FIELD

The disclosure relates generally to powering and control of electrochromic (EC) devices. More specifically the disclosure relates to photonically-powered and/or controlled EC devices.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. By way of example, one well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material. In other words, electrochromic windows are windows that can be darkened or lightened electronically. A small voltage applied to an electrochromic device (EC) of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960's, EC devices, and particularly EC windows, still unfortunately suffer various problems and have not begun to realize their full commercial potential despite many recent advancements in EC technology, apparatus and related methods of making and/or using EC devices.

SUMMARY

Electrochromic devices are powered and/or controlled using photonic energy. For example, a photovoltaic power converter is used to supply electricity to an EC device, where the photovoltaic power converter is supplied photons via, e.g., fiber optic technology. Photonic energy is also used as a means to carry communication between various components of a system which includes one or more smart windows. Applications include EC windows, e.g., windows where at least one EC device is incorporated into an insulated glass unit (IGU). In certain embodiments, the photovoltaic power converter is proximate, or integrated with, the IGU, e.g., in the secondary seal, in the spacer, or within the insulated gas space of the IGU. In one embodiment, the photovoltaic power converter is supplied photons via fiber optics. The fiber optics may be supplied with photons originating from a conventional laser, diode laser, sun concentrator, and the like. In certain embodiments, photovoltaic panels supply electrical energy to an electronic driver that energizes the diode laser; the diode laser delivers photons into an optical fiber, which in turn supplies photons to the photovoltaic power converter. Various methods of carrying both power and information using photonic energy in a system which includes one or more smart windows are described.

Benefits related to such methods, apparatus and systems include the ability to deliver power to an EC window via a remotely-located photovoltaic panel over long distances without electromagnetic interference (EMI), radio frequency interference (RFI) electrical cross-talk, line loss of power due to electrical resistance of conventional wiring, information loss due to carrier signal degradation, and the like. Further embodiments and advantages are described in more detail below.

In one aspect of the disclosed embodiments, an electrochromic (EC) window system is provided, including (i) an EC window; (ii) an EC window controller; (iii) a photovoltaic (PV) power converter configured to deliver electricity to the EC window controller; and (iv) an optical fiber configured to deliver a light energy to the PV power converter.

In various embodiments, the light energy may be supplied to the optical fiber from a diode laser. The diode laser may be energized by a driver, the driver receiving power from a photovoltaic array and/or a low-voltage power line of less than about 30 volts. In certain embodiments the light energy is modulated. The modulation may be implemented to achieve a smooth and/or rapid transition between different electrochromic states.

A controller may be used to demodulate the light energy when the light energy received from the optical fiber is modulated. For example, the controller may be configured to decode amplitude modulation in the light energy received from the optical fiber. Additionally, the controller may be configured to determine from the amplitude modulation the polarity of voltage or current to be applied to the EC window. In some embodiments, the controller may include an H-bridge. Alternatively or in addition, the controller may be configured to decode frequency modulation in the light energy received from the optical fiber. For example, the controller may be configured to determine from the frequency modulation the magnitude of voltage or current to be applied to the EC window.

In some cases, the photovoltaic array is positioned more than one meter from the EC window. For example, the photovoltaic array may be positioned on a roof of the building in which the EC window is located, or on the roof of a nearby building. Other configurations are also possible. Photonic energy transmission can be done over long distances with very high efficiency (low power and/or signal loss). The PV power converter may be positioned in a frame around the EC window, or integrated, at least partially, within a secondary seal of the EC window. In some cases the driver and diode laser are configured to deliver control information. The diode laser may feed to an optical cable, the optical cable running through a splitter, the splitters having a plurality of optical output fibers each configured to deliver control information to each of a plurality of EC window controllers. In some embodiments, the plurality of EC window controllers are configured in a daisy chain format.

In another aspect of the disclosed embodiments, an insulated glass unit spacer is provided, the spacer including a PV power converter. In various implementations, the spacer further includes an EC window controller. In some cases the EC window controller is configured to demodulate the light energy when light energy received at the window controller is modulated. For example, the window controller may be configured to decode amplitude modulation in the light energy received at the window controller. In certain embodiments, the window controller is configured to determine from the amplitude modulation the polarity of voltage or current to be applied to an optically switchable window in contact with the IGU spacer. The EC window controller may include an H-bridge in various cases. Alternatively or in addition, the window controller may be configured to decode frequency modulation in the light energy received at the EC window controller. In a particular embodiment, the window controller is configured to determine from the frequency modulation the magnitude of voltage or current to be applied to an optically switchable window in contact with the IGU spacer.

In a further aspect of the disclosed embodiments, an EC window IGU is provided, including a PV power converter configured to receive optical energy delivered via fiber optics. In certain embodiments, the PV power converter is positioned, at least partially, in a secondary seal of the IGU. The EC window IGU, in some implementations, may have no electrical wiring traversing a primary seal of the IGU. Further, the EC window IGU may include an EC window controller positioned, at least partially, in a secondary seal of the IGU. In some embodiments, the EC window controller resides entirely within the secondary seal.

The EC window controller may be configured to perform a variety of functions. In some cases, the EC window controller may be configured to demodulate optical energy when optical energy received at the EC window controller is modulated. For example, the EC window controller may be configured to decode amplitude modulation in the optical energy received at the EC window controller. The EC window controller may also be configured to determine from the amplitude modulation the polarity of voltage or current to be applied to the EC window IGU. Further, the EC window controller may be configured to decode frequency modulation in the optical energy received at the EC window controller.

In another aspect of the disclosed embodiments, an optically switchable device system is provided, including (i) an optically switchable device including bus bars; (ii) a PV power converter configured to apply a voltage to the bus bars; and (iii) an optical fiber configured to deliver a light energy to the PV power converter. The system may also include a plurality of optical fibers connected with a light source, where the optical fibers are configured to delivery light energy to each of a plurality of PV power converters coupled with each of a plurality of optically switchable devices.

In some embodiments, the optically switchable device system further includes an optically switchable device controller that defines the voltage and/or current applied to the bus bars by the PV power converter. In a particular implementation, the optically switchable device controller is configured to independently control the voltage and/or current applied to each of a plurality of optically switchable devices. The optically switchable device controller may be configured to demodulate light energy when light energy received at the optically switchable device controller is modulated. For example, the controller may be configured to decode amplitude modulation in the light energy received at the optically switchable device controller. The controller may be configured to determine from this amplitude modulation the polarity of voltage or current to be applied to the optically switchable device. Alternatively or in addition, the optically switchable device controller may be configured to decode frequency modulation in the light energy received at the optically switchable device controller. In certain embodiments, the system may further include a splitter that splits light energy between a first path that delivers light energy to the PV power converter and a second path that delivers light energy to the optically switchable device controller.

These and other features will be described below with reference to the associated drawings.

DETAILED DESCRIPTION

Figure 1A:
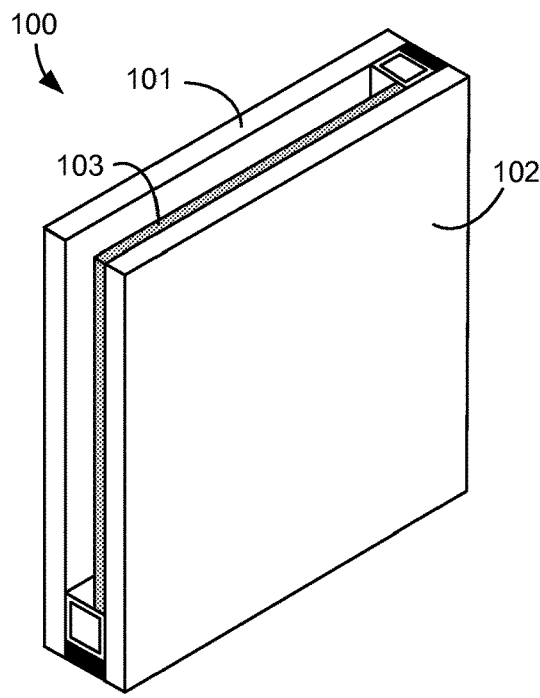
FIGS. 1A-B depict the basic structure of an electrochromic window device.

An "optically switchable device" is a thin device that changes optical state in response to electrical input. It reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

While the disclosure emphasizes electrochromic devices as examples of optically switchable devices, the disclosure is not so limited. Examples of other types of optically switchable device include certain electrophoretic devices, liquid crystal devices, and the like. Optically switchable devices may be provided on various optically switchable products, such as optically switchable windows. However, the embodiments disclosed herein are not limited to switchable windows. Examples of other types of optically switchable products include mirrors, displays, and the like. In the context of this disclosure, these products are typically provided in a non-pixelated format.

An "optical transition" is a change in any one or more optical properties of an optically switchable device. The optical property that changes may be, for example, tint, reflectivity, refractive index, color, etc. In certain embodiments, the optical transition will have a defined starting optical state and a defined ending optical state. For example the starting optical state may be 80% transmissivity and the ending optical state may be 50% transmissivity. The optical transition is typically driven by applying an appropriate electric potential across the two thin conductive sheets of the optically switchable device.

EC Windows

For many years the building industry has been burdened with two opposing trends. The first trend, the increasing demand for glass over other construction materials, is driven by a number of factors. Glass buildings are currently viewed as aesthetically more pleasing and more modern. Glass buildings also provide occupants with a number of advantages: better productivity, more natural lighting, absenteeism reduction, and improved comfort. Lighting engineers strive to create light sources which mimic natural light. The second trend, increased demand for energy efficiency, is conventionally at odds with the first trend. While increased use of windows can lower lighting requirements, it can also dramatically add to the cooling requirements of the building and negatively impact productivity and comfort due to increased glare. For example, commercial buildings use a large portion of public energy resources and yet a very large portion of that energy is wasted due to overburdening heating, ventilation and air conditioning (HVAC) systems due primarily to very poor energy efficiency of conventional windows. Conventional windows are simply not energy efficient and, at the same time, require expensive window treatments to reduce glare. In some cases these window treatments negatively impact occupant view, thus defeating the purpose of having a window.

Architects and builders have needed an energy efficient window that could accommodate changes in the environment and the needs of the building occupants by dynamically altering its optical properties to control the amount of sunlight and heat entering the building. One answer to this need is electrochromic window technology.

In the arena of window glazings, electrochromic coatings may serve to control the amount of light and heat passing through the glazing by user controlled applied electrical potentials across the optical device. Because electrochromic windows can be tinted or made clear via a small applied voltage, this technology has the potential to significantly reduce the amount of room heating or air conditioning, and it can also be used for privacy. Since the amount of glass currently used for various types of windows (e.g., skylights, aircraft windows, residential and commercial building windows, automobile windows, etc.) is on the order of one billion square meters per year, the potential amount of energy savings if these are converted to EC windows is substantial.

Figure 1B:
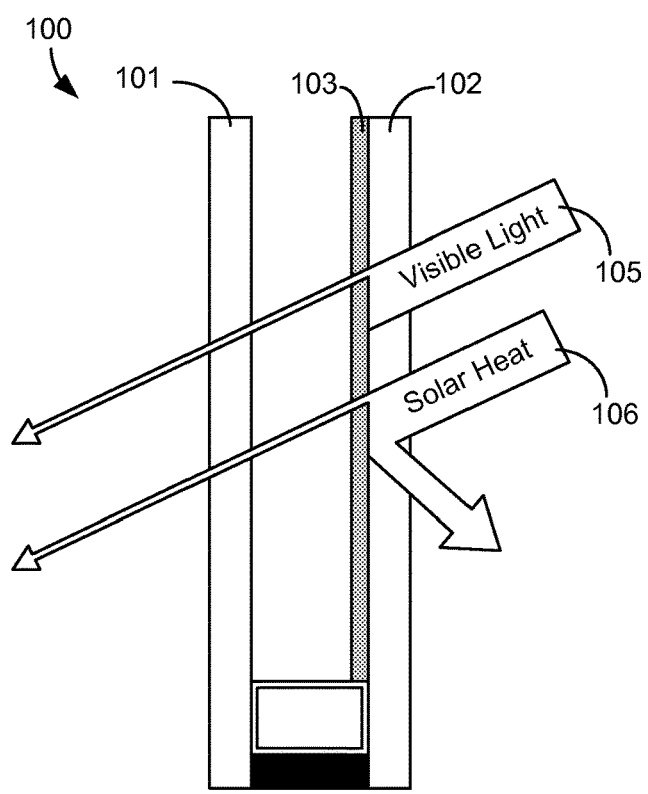

FIGS. 1A-B illustrate the basic principle of electrochromic window technology. A typical EC window 100 uses an IGU construct, just as a conventional window. The difference is that an EC window 100 has an electrochromic thin film coating 103 on one (or both) lites 101 and 102 of the IGU. The EC coating 103 can tint or clear upon application of a small electrical potential applied across the EC coating. When tinted, the EC coated lite 100 can block visible light 105 to provide occupant comfort, but also block solar heat gain 106 and therefore reduce cooling burden on HVAC systems. Also, there is no need for conventional shades or window treatments.

Conventional EC-PV Systems

One difference between EC windows and conventional windows is the wiring required to deliver electricity to the EC devices for switching from clear to tinted, and back again. Builders must integrate these wires into the framing systems of the windows. The wires from the EC windows eventually are connected to a source of power, e.g., a low-voltage run that ultimately is connected to a higher-power line source. In these low-voltage runs of wire, there are associated issues, e.g., voltage drop (line loss) due to the sometimes long lengths of wire required to incorporate a large number of windows in a building. Thus, it has been described as desirable to integrate a photovoltaic power source with the EC window in order to have a local power source for the EC device. This combination is also deemed desirable because, even though EC windows use little power, the EC window would be self-powered and thus be a net zero energy installation on its own, and collectively save even more energy on HVAC.

A combination of electrochromic and photovoltaic functions (from herein, "EC-PV" systems) may be employed in a system that, as a whole, is passive, i.e., when the sun is shining the power generated by the PV system is used to power the transitions of the EC system. EC-PV systems may take various approaches.

In one approach, a transparent PV coating is combined with an EC coating in a tandem fashion. This EC-PV system has many problems, primarily due to issues associated with the PV coatings. For example, transparent PV technology is not truly transparent; there is haze and an associated loss of light transmission when the PV coating lies between the sun and the EC coating (as is a typical configuration). The transmissivity in the clear state of the EC coating is reduced due to the reflections from multi-layer construction and absorption of the PV coating. As an example, dye sensitized PV coatings (e.g., dye sensitized $TiO_2$) have associated absorption due to the dye component of the system. Another issue with this type of system is if the EC coating is between the sun and the PV coating, when the EC coating tints, the PV loses power, so it can operate only in a self-limiting fashion. Also, transparent PV technology is not robust. Typically, transparent PV coatings are organic-based and therefore may break down in the harsh conditions of solar radiation and heat. Moreover, although many EC systems require relatively little power, current transparent PV technology simply does not produce sufficient power for most EC device needs—the technology is not yet sufficiently efficient. Further complicating this approach is integration of the EC and PV coatings in the IGU. If combined on a single lite, there are often compatibility issues and integration issues related to transferring power from the PV to the EC coating, extra wires, etc. If configured on separate lites of an IGU, the intercompatibility issues between the EC and PV technology may be overcome, but the integration and wiring issues remain. Put simply, the tandem EC-PV design is more complex to construct and engineer than an EC device alone, no matter how one configures the PV.

Another approach places conventional, more well-established, reliable and robust, non-transparent PV cells proximate the EC coating or situated in what would otherwise be a viewable area of the EC window. In this approach, PV cells are placed in the window frame, close to it, or share the same space as the EC device, thus blocking a portion of the viewable area. This blockage results in less solar control and poor aesthetics for the viewer. Smaller PV cells could be used to decrease the negative visual impact of the PV cells, but this approach also decreases the amount of electrical power generated, which may be insufficient to power EC device transitions. Also, the aforementioned integration issues remain, with some additional issues, including reworking or designing new framing systems, customer rejection due to poor aesthetics and the like.

Photonic Powered EC Windows

The present disclosure describes solutions to the limitations of conventional EC-PV systems. It addresses challenges arising from the integration of EC and PV technologies. Both EC and PV technologies require large amounts of area—EC technology because it is designed to cover the viewable area of windows, and because occupants and architects especially prefer large windows; PV technology because it is used to harvest solar energy, and in order to harvest more energy, more area is required. The goals of the two technologies are inherently at odds with each other, both from an aesthetic perspective and an engineering perspective.

From an aesthetic perspective, the goal of EC window technology is to cover large areas of viewable area with beautifully-tinting glass to enhance occupant comfort and experience—people like the look of, and to look through, unobstructed (high-clarity) windows. The goal of PV technology is to cover large amounts of area in order to capture as much solar energy as possible; aesthetics are completely beside the point—PV panels are typically placed on the roof or in remote locations, not only to capture more light using unobstructed geography, but also because people do not tend to find them particularly attractive and don't want (or need) to see them. This aesthetic issue could be overcome if a truly transparent (and efficient, reliable and robust) PV technology can be achieved for use in a tandem EC-PV system. But even if the latter (laudable) goal is achieved, there are still engineering issues related to integration of the PV and EC technologies.

As described above, from an engineering standpoint, it is difficult to integrate EC and PV technology in, or proximate, an IGU or the framing system of the IGU. Besides the above described issues with integration, the PV cells used in these systems are simply not large enough to generate sufficient power for the EC system to effectively switch. Making the PV cells larger only exacerbates the aesthetic and integration issues. Even if one were to find an elegant solution to overcome the myriad of engineering issues, the poor aesthetics of these systems put a damper on demand—simply put, they are clunky and unattractive.

If a PV system is not located in close proximity to the EC system, there is significant line loss due to transmission over conventional low-voltage wiring systems in buildings and other structures employing EC windows. Additionally, current carried over such lines is susceptible to electromagnetic interference, radio frequency interference, and inefficiency of transmitting electricity over long spans of wire.

The disclosed embodiments overcome these issues by delivering energy to an EC device using photonic power. For example, photonic power may be beamed through an optical fiber or through space (e.g., via a laser beam) and into a photonic power converter which converts the light energy to electricity, which is used to transition the EC device (e.g., via an EC controller).

In certain embodiments, the photovoltaic power converter is proximate or integrated with the IGU, e.g., in the secondary seal, in the spacer, and/or within the insulated gas space of the IGU. In certain embodiments, the photovoltaic converter may span at least the width of a secondary seal and a portion (or all) of the width of the spacer. In one embodiment, the photovoltaic power converter is supplied photons via fiber optics. The fiber optics may be supplied with photons from a conventional laser, diode laser, sun concentrator, or the like. In certain embodiments, one or more photovoltaic panels supply electrical energy to an electronic driver that energizes the diode laser; the diode laser delivers photons into an optical fiber, which in turn supplies photons to the photovoltaic power converter. The photovoltaic power converter converts the photons back to electrical energy for transitioning the EC window. As described in more detail herein, the photons may be modulated in order to, e.g., carry information used to control the EC window.

Benefits related to such methods, apparatus and systems include the ability to deliver power and instructions to (and from) an EC window via a remotely-located photovoltaic panel over long distances without electromagnetic interference (EMI), radio frequency interference (RFI) electrical cross-talk, line loss of power due to electrical resistance of conventional wiring, and the like. Further details are described below in relation to specific embodiments, although the scope of the invention is not intended to be limited in this way.

Figure 2:
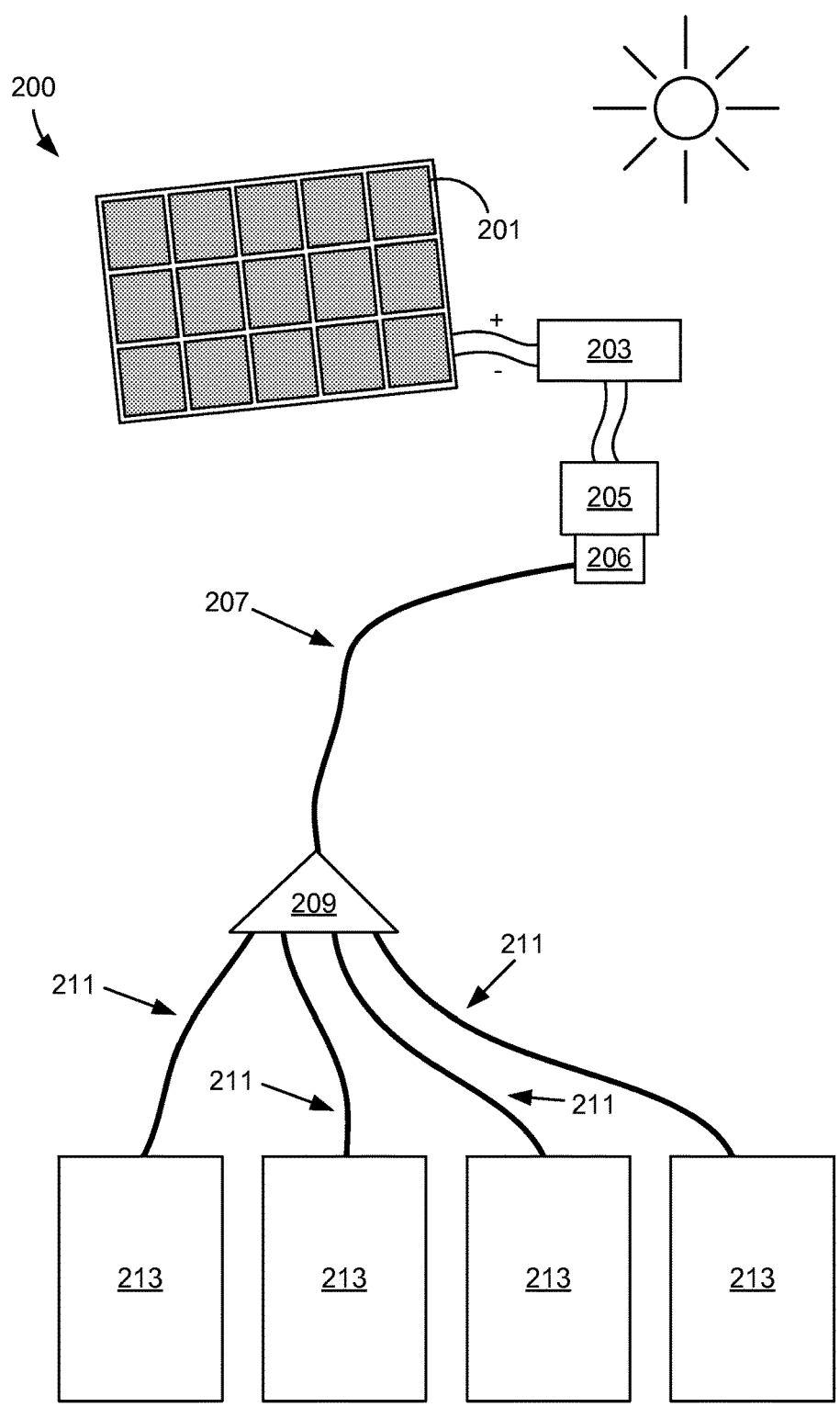
FIG. 2 shows an exemplary electrochromic-photovoltaic (EC-PV) system where photonic power transmission is used to supply energy from the PV device to EC windows.

FIG. 2 depicts an exemplary EC-PV system 200 where photonic power transmission is used to supply energy from a PV system to EC windows. A solar panel 201 is connected to a voltage controller 203 so that the correct voltage can be applied to a electronic driver 205. Electronic driver 205 may use only a small fraction of the output of the solar panel, in this way many such drivers may be powered by the solar panel, or, e.g., such drivers may be supplied by various solar panels. The driver 205 powers a concentrated light source 206. In other words, the driver 205 and light source 206 work together to convert electrical energy into optical energy. In certain cases, the driver 205 and light source 206 are collectively referred to as a "power module" (which is distinct from a photonic power module, which includes additional elements as described herein). In one example, the concentrated light source 206 is a laser, e.g., a diode laser. The diode laser output is delivered through optical fiber 207 to (in this example) a splitter 209, which in turn delivers photonic energy via optical fibers 211 to a number of IGU's 213 containing EC devices. The photonic power may be delivered with relatively little loss or interference over distances that are encountered in various types of buildings and vehicles. In this example, in or proximate each IGU 213, is a photovoltaic power converter (not shown), which converts the photons delivered to it by the optical fiber 211 into electricity which is used to drive the EC device(s) of the IGU 213. The electrical power would typically be delivered from the photovoltaic power converter to an EC window controller.

The driver 205, light source 206, optical fibers 207, optional splitter 209, optical fibers 211, and photovoltaic power converters may collectively be referred to as a photonic power module (PPM). Further, the PPM may include a voltage controller. In some cases the PPM may be simpler, consisting of a driver, light source, a single optical fiber, and a single photovoltaic power converter. Various implementations are possible depending on the desired design and the number of EC devices being powered by the PPM.

Photonic power modules are commercially available from various manufacturers and vendors including, for example, JDS Uniphase Corporation ("JDSU") of Milpitas, CA. In one example, a power module such as one obtained from JDSU (e.g., a PPM-5 Photonic Power Module) requires an input of only a few volts (e.g., about 5 volts) of direct current (DC), which can easily be delivered from a solar cell (as depicted in FIG. 2). Such Photonic Power Modules (PPM's) are typically configured as isolated power supplies. As noted above, an exemplary PPM includes a laser module with a driver, a fiber patch cord to transmit the laser energy, and a photovoltaic power converter to convert the laser energy to electrical energy. For example, such PV power converters have outputs in the range of about 2-15 volts —this is well within the operating voltage of many EC devices, particularly EC windows, even large size EC windows (for example, View, Inc. of Milpitas, Calif., produces all solid state and inorganic EC windows as large as 60" by 120" that operate on as little as a few volts). Also, the lifespan of a diode laser is on the order of about 70,000 hours at 40 degrees C., since the EC window is powered only intermittently, the diode should last on the order of about 15-20 years. This is commensurate with the lifespan of a robust EC window.

With solar panels giving an output of around 75-350 watts for a 2×4 ft panel, there is more than enough power to energize one or more photonic power modules. For example, at 9 watts/ft$^2$, such a panel may be used to surround each individual frame of the IGU. However, since there is a large base of established solar panels on the roofs of residential and commercial buildings, certain implementations tap this source of energy, when available. As described above, powering EC devices via photonics may use only a small fraction of the output of a particular solar panel. This provides flexibility for installing, e.g., retrofitting, photonic powered EC windows in any number of existing PV-supplied buildings.

Alternatively to PV power, e.g., in the event such buildings do not have a solar panel installation, the energy delivered to the driver of the photonic power module can be supplied by in-house electricity or even by a bank of batteries. In one embodiment, line voltage is used to energize the driver/light source, e.g., in a convenient run of low-voltage line, and fiber optic cable is used to deliver the power from the light source to the EC window(s). In one embodiment, a plurality of EC window controllers and optionally I/O controllers are daisy chained together to create networks of EC windows, for automated and non-automated EC window applications. This configuration is described in U.S. patent application Ser. No, 13/049,756, filed Mar. 16, 2011, titled "Multipurpose Controller for Multistate Windows," which is incorporated by reference herein. In this embodiment, a plurality of photonic power modules is used to carry power to the EC window controllers.

Regardless of the type of power source used to energize the photonic power module, the power source can be remotely located from the EC windows and still transmit power without the issues associated with conventional power transmission. For example, according to its specifications, the PPM-5 can deliver between about 0.5 to 1 W of power in the 750 to 850 nm and 900 to 1000 nm range, depending on the laser source selected. Power can be delivered over distances of 0.5 km or greater using 62.5 µm or 100 µm multimode optical fiber. Since power can be transported by fiber optic up to 500 m (or 1500 feet) with little loss, there will be little loss of power for window applications for all residential building and most commercial buildings. For example, for a multimode fiber with an 850 nm source, the loss is about 3 dB per km, corresponding to a loss of about 1.5 dB over a distance of 500 m. This loss represents about 30% of the total power transmitted (70% of transmitted power reaches the load). Similarly, for a singlemode fiber with a 1550 nm source, the loss is about 0.4 dB per km, which corresponds to a loss of only 0.2 dB over 500 m. In this case the efficiency of power transmittal may be much greater. In some embodiments, the PV power source may be located outside the building housing the EC windows. PV power may be generated in a common area for multiple buildings or it may be generated in one building and shared with one or more neighboring buildings.

Also, e.g. as depicted in FIG. 2, from a single fiber optic 207, the light may be broken down into sub-fiber conduits 211 so that multiple IGU's 213 may be powered off of an individual driver 205/light source 206 pair. A splitter 209 (known in the industry as a "tree splitter" and commercially available from a number of fiber optic suppliers) may be used to "split" the incoming light source into multiple outlet optical fibers 211. This split allows multiple EC windows 213 to receive power from a single driver 205/light source 206. Also, fiber optic cable is much easier to handle and install than electrical wiring, saving time and simplifying installation of EC windows. Use of fiber optics also protects installers from having to handle electrical wires that might be energized inadvertently, thereby making the installation process less dangerous or problematic. Moreover, optical fiber simplifies the configurations for power delivery to the EC window controller as well as delivery of power to the EC device itself. This concept is explained in more detail below.

In some embodiments, the solar panel, voltage controller, driver, and laser are replaced with a solar light concentrator, which delivers light of appropriate wavelengths to the optical fiber.

Figure 3:
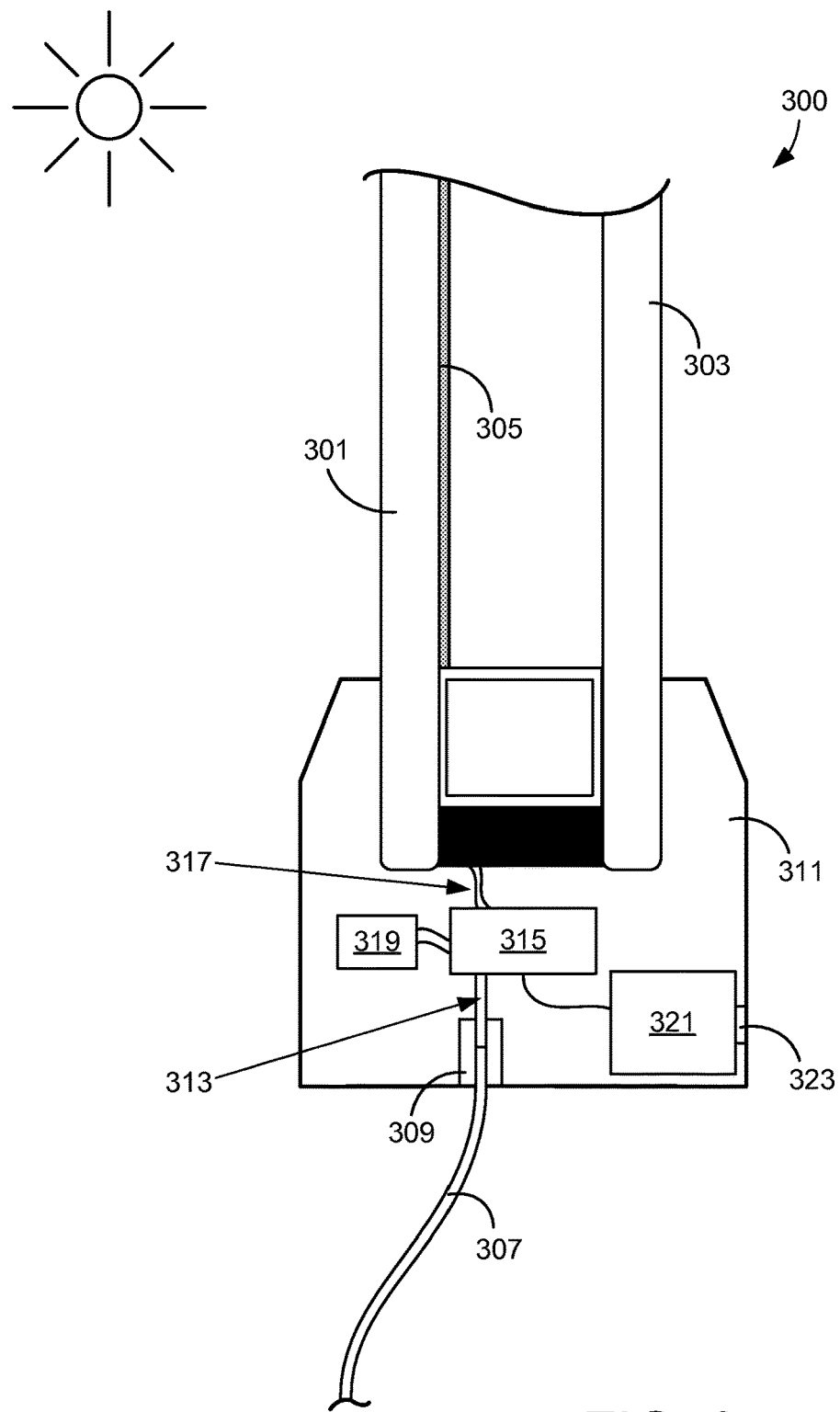
FIG. 3 illustrates an embodiment of an electrochromic device which transforms light energy to electrical energy at or within an insulated glass unit.

In various embodiments, an EC controller is energized via photonic energy, and energy may also be delivered from the controller to the EC device via photonic energy. FIG. 3 depicts an embodiment showing how power can be transformed from light to electricity at or within an IGU. The IGU 300 includes a first pane 301 and a second pane 303. In this embodiment, the first pane 301 faces toward the outside of the building, and the second pane 303 faces the interior of the building. The interior surface of the first pane 301 includes a layer of electrochromic material 305. In certain embodiments, an incoming fiber 307 is placed at normal incidence at, e.g. an IGU in window frame 311. The actual angle at which the incoming optical fiber 307 is oriented is not critical, so long as it aligns with the interior optical fiber 313. In some cases, a transparent window may be present where incoming optical fiber 307 meets the IGU. The transparent window may have an anti-reflective coating on it.

The incoming optical fiber 307 is aligned with an interior optical fiber 313 that is attached to the photovoltaic power converter 315. In certain embodiments, optical fibers 307 and 313 are aligned and optically coupled via a plug and socket architecture, 309, as are commercially available. In the embodiment described in relation to FIG. 3, the photovoltaic power converter 315 is hidden within the window frame 311, which holds IGU 300. Power converter 315 delivers its electrical output to wires 317, which are electrically connected with bus bars (not shown), which power the transition of EC coating 305. Optionally, a storage device 319, e.g., a trickle charge battery, is included. Storage device 319 can aid operation, for example when a logic device 321 (e.g., a controller implemented on an embedded micro controller, programmable logic controller, or application specific integrated circuit) includes instructions to turn off external power to the EC system or during the colored holding period when minimal power is required to offset leakage current through the EC device, or to store energy for later use. In some implementations, the controller may include systems on a chip (SOCs), for example from the Kirkwood series of processors from Marvell Semiconductor, Inc. of Santa Clara, Calif., or from the PIC series from Microchip Technology of Chandler, Ariz. In one embodiment, controller 321 receives input via an infrared (IR) signal, e.g., from a touch pad from the interior of the room where the IR signal passes through an IR transparent window 323, e.g., in frame 311. A remote controller may also provide instructions to controller 321.

In the depicted embodiment, at IGU 300, incoming optical fiber 307 stops just short of, or abuts, fiber 313 of the hermetically sealed IGU 300. The light is focused on an aligned fiber 313 which catches all the light emanating from the incoming optical fiber 307, which is supplied by a laser (not shown). Fiber 313 is connected to PV power converter 315. For example, a power converter from JDSU can have electrical output in the range of between about 2 and 12 volts. In particular, a PPC-4E from JDSU delivers up to about 4 volts with an electrical power of up to about 500 mW. Higher power systems up to about 5 watts can be obtained by using multiple lasers and combining the output at the end of the fibers.

Note that an optical window or optical socket can be placed on different surfaces of the window frame. In some embodiments the transparent window or optical socket is on a different face of the frame, for example on the bottom surface where the optical fiber delivers light through the bottom of the frame, or on the top surface of the frame where the optical fiber delivers light through the top of the frame (in which case the power converter 315 and associated elements may be located in a top portion of the frame). The optical window or optical socket need not be on the same surface of the frame as, e.g., the IR window for the EC controller, but in one embodiment the optical input is on the same side of the window frame as other inputs.

An EC device, depending on the size of the window and other parameters, may operate at between about 1 $\mu A/cm^2$ and about 60 $\mu A/cm^2$. For example, a 2 ft×2 ft window has an area of about 3,600 $cm^2$. Therefore, near the maximum current limit the window should consume about $50\times10^{-6}$ amps/$cm^2 \times 3,600$ $cm^2 = 180\times10^{-3}$ amps or 180 milliamps. Using a power module at 2 volts at 500 milliwatts power, there is 250 milliamps of current available, which is more than enough to operate such a window. For windows that only use 10 $\mu A/cm^2$, the total current on a 2 ft×2 ft window would be 80% lower, allowing 5 windows to easily operate off of a PPM-5 Photonic Power Module system. Larger EC windows may require a dedicated photonic power module, depending on the efficiency and output of the PPM. Lower currents can be used, e.g., if slower EC device transitions are acceptable. When fully tinted, the current necessary to hold the tinted state is very low and will approximate any leakage current. During this stage, the power continues to collect in the auxiliary battery as shown in FIG. 3.

The EC system can be of any type, although in one embodiment the design is as described in pending US patent applications, US 2011/0267675, US 2011/0267674, US 2011/0266138, US 2011/0266137 and US 2011/0249314, each assigned to View, Inc., of Milpitas, Calif., and each of which are herein incorporated by reference. The EC coatings can be on any transparent substrate, such as glass, rigid plastic or flexible plastic. In the case of flexible plastic, the EC coatings can be suspended in an IGU or laminated to the glass face on the interior surface of the exterior pane of the IGU.

A local EC window controller and associated photovoltaic power converter can be in the frame of the window, or it can be wholly or partly integrated between the panes of the IGU, e.g. in the secondary seal of the IGU. Optical fiber not only simplifies installation by obviating the need for electrical wiring, but also can simplify delivery of power to the IGU regardless of the configuration of the controller. This is described in more detail below.

Figure 4:
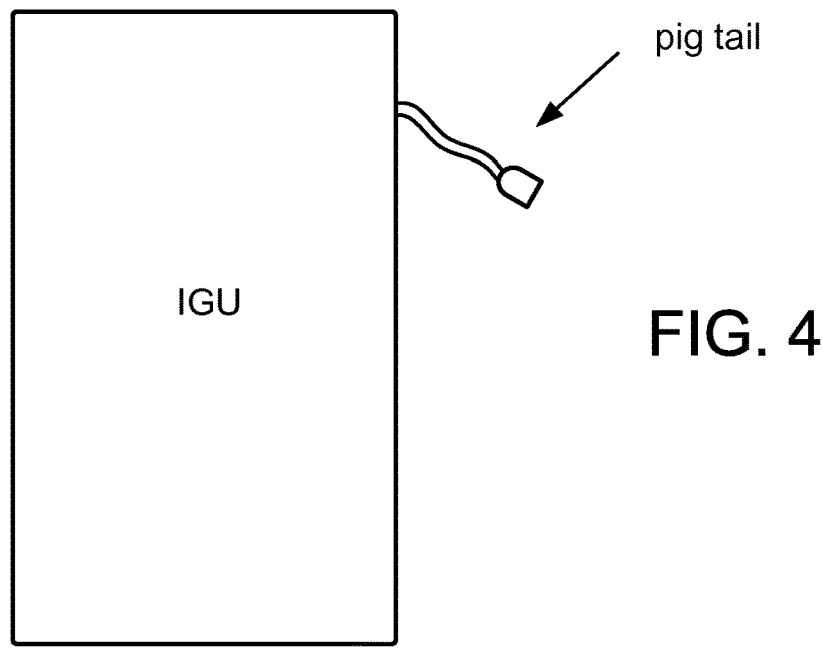
FIG. 4 shows an embodiment of an insulated glass unit having a pig tail connector.

As depicted in FIG. 4, in some EC systems, electrical wiring runs into a window frame and to a "pig tail" connector which is used to deliver power to the bus bars of the EC device in the IGU. The pig tail is part of the wiring harness of the IGU. The IGU may not use a pig tail, but rather may have a plug integrated into the secondary seal so as to avoid wires protruding out of the IGU prior to installation. The EC window controller delivers power to the EC device via a pig tail or, in some instances, the window controller, or one or more components thereof and the wiring harness, is integrated into the IGU itself. Thus a pig tail may be used to deliver power to the EC controller. Such "onboard" EC controllers are described in U.S. Pat. No. 8,213,074, titled "Onboard Controller for Multistate Windows," which is incorporated by reference herein. Further wiring and/or controller configurations are described in U.S. patent application Ser. No. 13/326,168, filed Dec. 14, 2011, and titled "CONNECTORS FOR SMART WINDOWS," which is herein incorporated by reference in its entirety. The embodiments described in the Ser. No. 13/326,168 application may be powered by the photonic power means disclosed herein.

Figure 5:
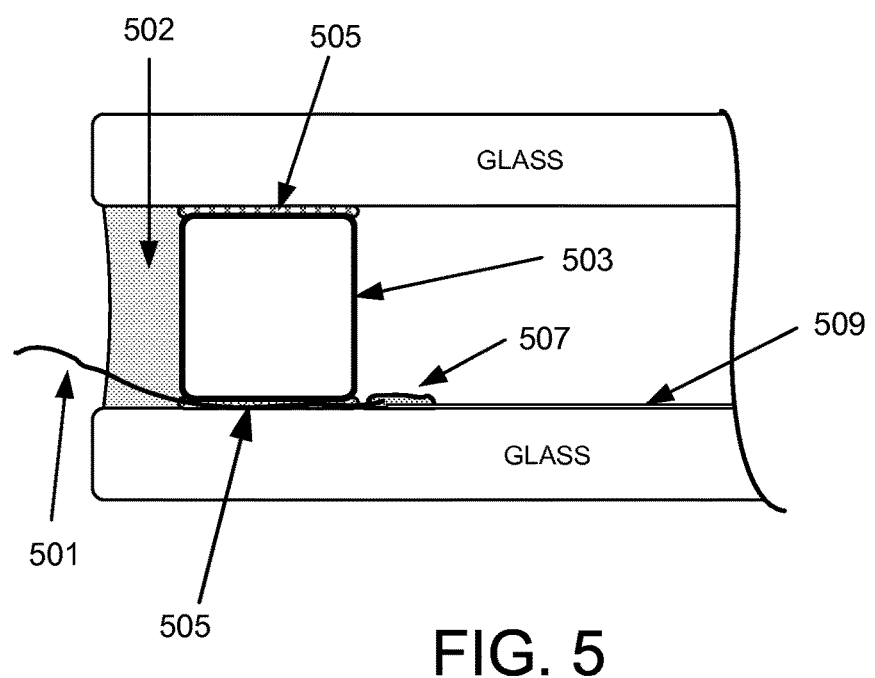
FIG. 5 depicts a close-up cross sectional view of an electrochromic insulated glass unit having electrical wiring that passes through a primary and a secondary seal of the insulated glass unit.

No matter the configuration of the controller, conventional systems have electrical wires that must traverse the secondary and primary seal of the IGU. This is depicted in FIG. 5. FIG. 5 depicts a partial cross-section of a conventional EC window IGU. As illustrated, the electrical supply wire 501 must pass through the secondary seal 502 and the primary seal 505 and in order to supply the bus bar 507 with power. The primary seal 505 is positioned between the spacer 503 and the glass (i.e., the sealant between the spacer 503 and glass is the primary seal 505). The bus bar 507 applies the voltage used to change the optical state of the electrochromic layer 509. This wire traversal may compromise primary seal 505. Spacers for improving this configuration are described in U.S. patent application Ser. No. 13/312,057, filed Dec. 6, 2011, and titled, "Improved Spacers for Insulated Glass Units," which is incorporated by reference herein. Optical fiber technology and photonic power conversion can obviate the need for wires traversing the primary seal. An exemplary embodiment is described below in relation to FIGS. 6 and 7.

Figure 6:
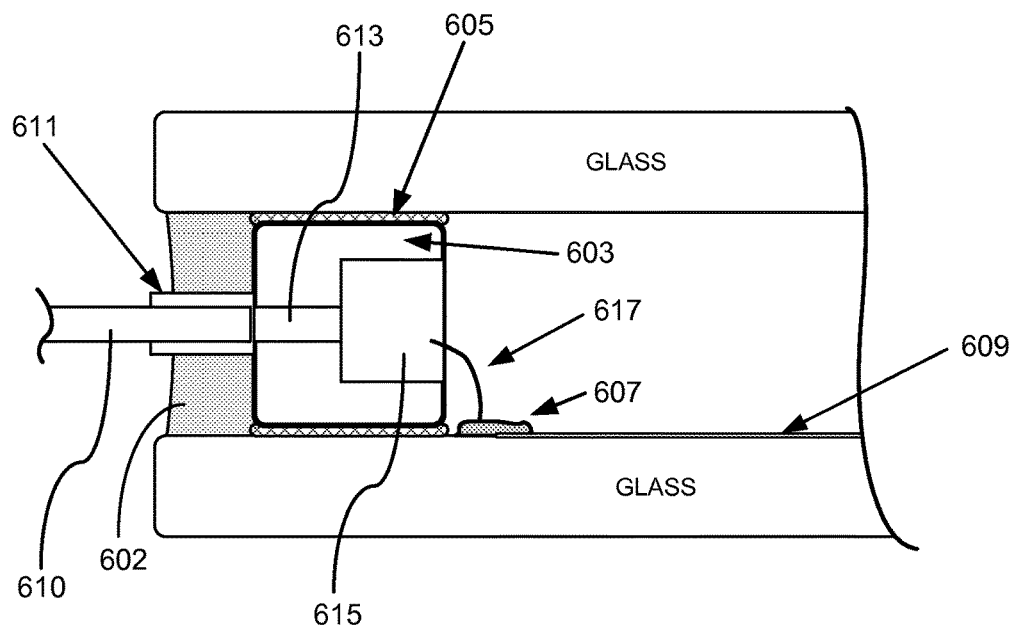
FIG. 6 depicts a close-up cross sectional view of an electrochromic insulated glass unit having an optical fiber that passes through a secondary seal of the insulated glass unit, according to a disclosed embodiment.

In certain embodiments, the optical fiber is coupled via an optical conduit in the spacer to the PV power converter, which resides in the spacer of the IGU. This is illustrated in FIG. 6. The fiber optic 610 runs through the secondary seal, 602, (via an optical fiber socket 611) and to an optical fiber coupler (light conduit) 613. For example, optical fiber couplers and hermetically sealed feed through units are commercially available from Fiberdesign, B.V. of the Netherlands or from Accu-Glass Products, Inc. of Valencia, Calif. The PV power converter 615 is located in the spacer 603 of the IGU. The wiring 617 to the bus bars 607 runs from the PV power converter 615 to the bus bars 607. The bus bars 607 apply a voltage to the electrochromic film 609. In one example, fabrication of the IGU may include applying primary sealant, soldering the bus bar wires emanating from the spacer to the bus bars, and hermetically sealing the IGU. The design shown in FIG. 6 is preferable to the conventional design shown in FIG. 5 because there is no wire or other conduit traversing the primary seal. Thus, there is less risk that the primary seal will become compromised over the lifetime of the window.

Figure 7:
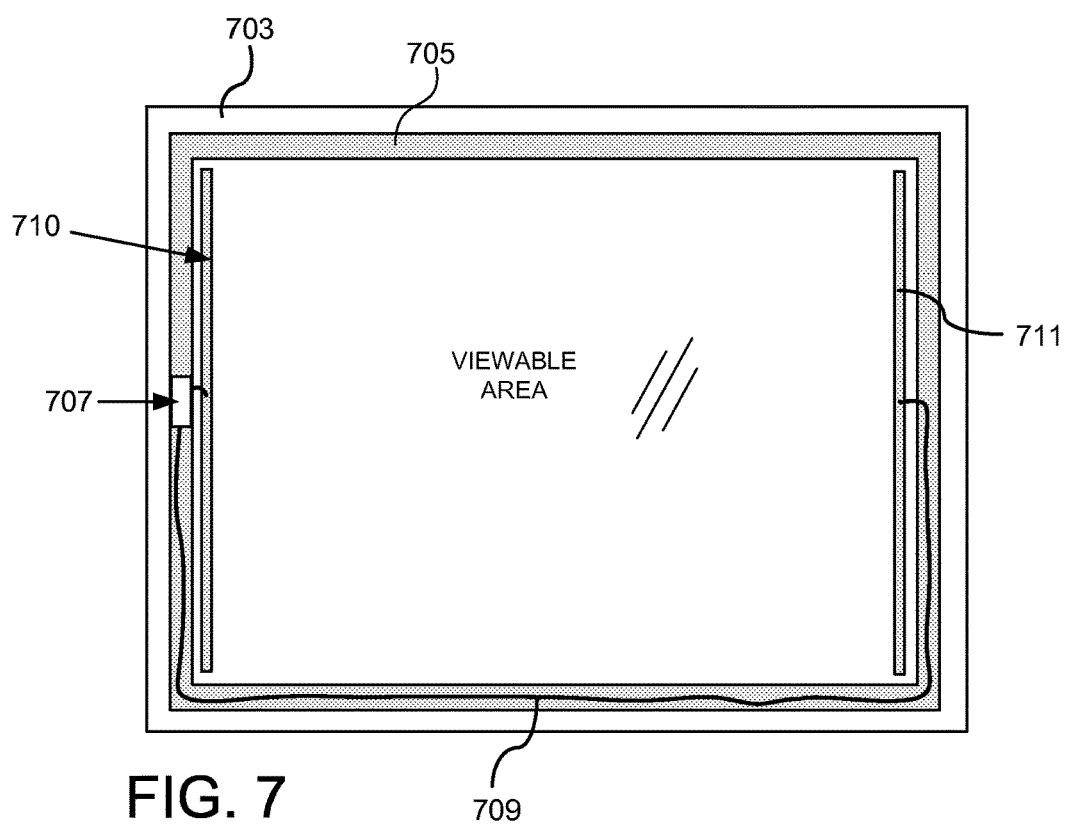
FIG. 7 shows an electrochromic insulated glass unit having wiring enclosed in a spacer positioned proximate the periphery of the insulated glass unit.

As shown in FIG. 7, wiring 709 for the distal bus bar 711 (i.e., the bus bar opposite the bus bar 710 proximate the PV power converter 707) can be run inside the spacer 705, which is positioned inside of the secondary seal 703. By having electrical wire 707 only inside the spacer 705, and emanating only from the surfaces of the spacer within the primary seal, a more robust IGU seal is realized. One of ordinary skill in the art would appreciate that the PV power converter can be configured so that it is equidistant from each of the bus bars 710 and 711 such that there is matched wiring in the spacer 705.

Various advancements in window design including improved spacer/IGU configurations, bus bar and wiring placement (e.g., designs having all bus bars and wiring positioned outside the window's viewable area, for example in a primary seal/under a spacer), and improved bus bar contacts are described in the following Patent Applications: U.S. patent application Ser. No. 13/456,056, filed Apr. 25, 2012, and titled "ELECTROCHROMIC WINDOW FABRICATION METHODS"; U.S. patent application Ser. No. 13/312,057, filed Dec. 6, 2011, and titled "SPACERS FOR INSULATED GLASS UNITS"; and PCT Application No. PCT/US2012/068950, filed Dec. 11, 2012, and titled "CONNECTORS FOR SMART WINDOWS", each of which is herein incorporated by reference in its entirety.

The PV power converter may be integral to, or coupled with, an onboard EC window controller located, at least partially, in the secondary seal of the IGU. In one embodiment, both the PV power converter and the EC window controller are partially or fully within in the secondary seal. In another embodiment, both the EC window controller and the PV power converter are housed within the spacer. In another embodiment one of the PV power converter and the EC window controller is in the spacer while the other is in the secondary seal. One or more components of the EC window controller may be in the spacer and/or the secondary seal. Using such configurations (and configurations like those described in relation to FIGS. 3, 6, and 7), the need for electrical wiring within the spacer may be minimized or avoided altogether. In other words, light energy, rather than electrical energy, traverses the spacer. In any of these embodiments, whether the components are in the secondary seal and/or in the spacer, only an optical fiber need be attached to the IGU, greatly simplifying installation of EC windows. In such embodiments, the power and communication runs between a light source and the EC windows may be as simple as a single optical fiber. The optical fiber leading to the EC window may then couple with a receiving optical fiber as described above.

In certain embodiments, the light transmitted through the fiber optic to the IGU is modulated to deliver power at a specified frequency to the EC controller. This modulated power can be used to drive the EC device in a certain way, e.g., rather than, or in addition to, having the EC controller modulate the power.

In various embodiments, control information is provided photonically. The control information controls some aspects of the operation of the photonically powered electrochromic device. It may not be sufficient to simply deliver power from a photonic source to the electrochromic device. In some implementations, the control information is provided to the electrochromic device to effectuate the transition. Thus photonic energy is used both to transfer power and deliver and/or receive information. In certain embodiments, photonic powering and communication are used in combination with wireless (WiFi) communication.

Examples of the control information that can be provided photonically include the magnitude of the applied voltage, the polarity of the applied voltage, and additional logic such as daily periods of time when the window must be tinted, the address of optically switchable devices such as electrochromic windows receiving such control information. Other examples of the third type of information include schedules where different windows under control of an upstream photonic driver tint at different times and/or for different durations. For example, the default condition in a bank of windows involves tinting upper windows for two hours and tinting the bottom windows all day. As another example, the logic may require a window tint no more than a certain number of hours per day (e.g., 8 hours). The prior examples describe "downstream" data transfer (e.g., to the EC controller). It is also possible to implement "upstream" data transfer in some implementations. In this case, information sent back upstream may relate to the current conditions of the EC device such as the actual voltage and current applied to the device, temperature, and operating conditions or other status signals derived from the micro controller (e.g., EC is tinting or clearing, is tinted to 20%, 40% etc.)

In certain embodiments, the optically switchable device controller contains logic for interpreting the control information and applying the appropriate voltage to the window at the appropriate time. In some embodiments, the logic corresponds to logic element 321 in FIG. 3. Sometimes the logic is implemented as controller hardware locally present at the optically switchable device. Other times, the logic is partially implemented as software for controlling a processor. In general, the logic serves as a controller for controlling the operation of an associated optically switchable device.

Control information must be interpreted locally at the optically switchable device and/or remotely at an upstream controller responsible for dictating the transitions of multiple optically switchable devices under its control. In some cases, control information such as the magnitude of a voltage required to drive a device transition and the polarity of the voltage is encoded upstream but the information is separately decoded locally at the device. For example, the drive voltage magnitude is decoded by one mechanism and the voltage polarity is decoded by a different mechanism.

In certain embodiments, control information is delivered photonically to the optically switchable device undergoing transitions. In other embodiments, the control information is received by the optically switchable device local controller by non-photonic means. Such means may be conventional electrical wiring or wireless media such as a Bluetooth connection, etc. In cases where photonic delivery is employed, the control information may be conveniently delivered together with the light beam responsible for powering the optically switchable device transitions.

Within the context of photonic transmission of control information, three embodiments will now be presented. These embodiments differ from one another in how types of control data are encoded upstream in a light beam. The types of control information that are encoded differently or at least potentially encoded differently include (1) the polarity of the voltage applied to the optically switchable device, (2) the magnitude of the voltage applied to the optically switchable device, and (3) other types of logic used by the optically switchable device. Types of encoding include frequency modulation and amplitude modulation. Either of these can be applied to a source of photonic power, whether that source is a laser, a solar collector, etc.

First Embodiment

The source of photonic power contains no frequency modulation (i.e., the source delivers constant photonic power), but it is amplitude modulated. In other words, the source is amplitude modulated before it is introduced to a fiber or conveyed to the photovoltaic converter at the optically switchable device. The amplitude modulation in this embodiment provides all three types of control information. This embodiment allows flexibility for controlling each of many downstream optically switchable devices independently. The control is more granular on a per device basis. However, as a trade-off, the device's local controller must be more sophisticated. Each controller might require a pulse width modulator, for example.

When the upstream controller provides control information to many different types of optically switchable devices, it must include address information with each of the distinct types of control information it sends downstream. This way, each of the devices recognizes whether the control information is intended for it, in which case it must pay attention to the information, or whether the control information is for a different device, in which case it can ignore the information.

Second Embodiment

The light beam is modulated both by frequency and by amplitude. In some embodiments, the magnitude of the applied voltage is provided by frequency modulation and the polarity of the applied voltage and the remaining types of control information are provided by amplitude modulation. As an example, the signal is rectified by, e.g., a photovoltaic cell or the UDSU PPC or similar device, and the magnitude of the applied voltage is thereby encoded by the duty cycle of the frequency modulation applied upstream. The amplitude modulation is decoded by, e.g., an H-bridge located in the optically switchable device controller. This embodiment works well when all windows under control of the upstream driver have the same or similar drive voltage requirements. It has the benefit of scaling to a large number of devices controlled by a single upstream driver. A simple circuit on a small printed circuit board or single semiconductor device chip may be used. In one implementation, a PIC16LF1784 microcontroller from Microchip Technology of Chandler, Ariz. is used. The microcontroller may be used to decode AM information and determine polarity requirements. Further, an LV8019V H-bridge from ON Semiconductor of Santa Clara, Calif. may be used to implement the desired polarity. In such cases, the upstream circuitry responsible for encoding drive voltage magnitude is a pulse width modulator, a relatively expensive piece of equipment.

Various mechanisms for providing frequency modulation may be used. In one example, the light beam from a laser or solar collector is passed through a chopper that rotates at varying frequencies. In another example, a bar reciprocates in front of the light beam. One other embodiment involves frequency modulating the energy used to drive a laser.

Various mechanisms for providing amplitude modulation may be used. Examples include movable reflective and/or refractive elements that move angularly in front of the beam before delivery to optically switchable devices. Such devices are commonly controlled by piezoelectric mechanisms. In some cases, a graded optical density member is moved in front of the light beam. Such member may be controlled by, for example, a voice coil. Another embodiment involves amplitude modulating the energy used to drive a laser. Other examples include mechanisms for bending the fiber that conveys the light beam.

Third Embodiment

In this embodiment, all types of control information are provided by frequency modulation. Typically, in this embodiment no amplitude modulation is applied to the source of photonic power. Thus, polarity, magnitude, and any other control information are encoded upstream by frequency modulation.

In summary, embodiments 2 and 3 shift much of the control logic upstream of the EC controller and IGU and allow relatively small, power efficient, and inexpensive controllers associated with the devices under control of a single upstream photonic driver. As a consequence, on board controllers for electrochromic devices such as the controllers described in U.S. Pat. No. 8,213,074 issued Jul. 3, 2012, which is herein incorporated by reference in its entirety, may be used.

Figure 8A:
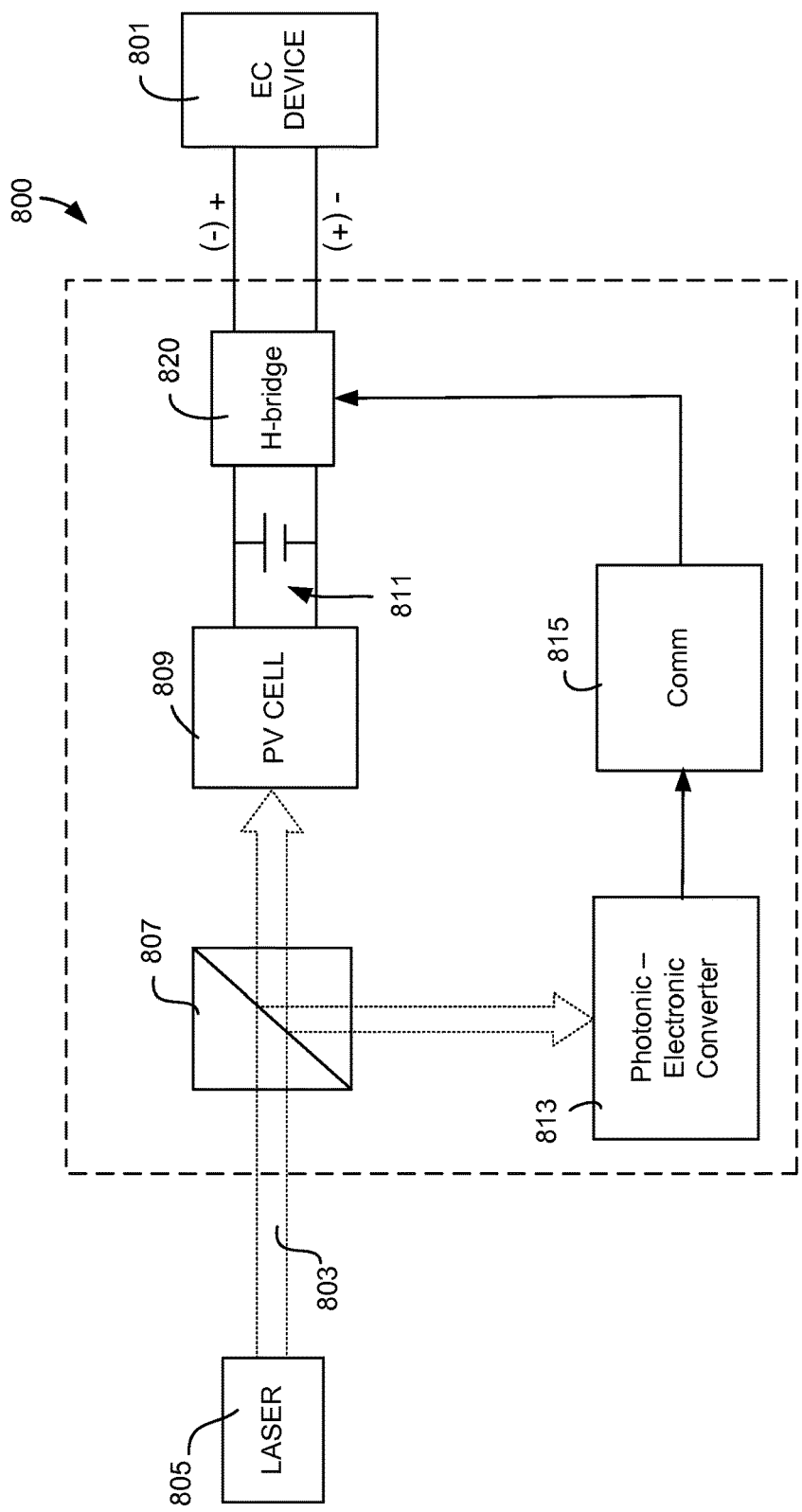
FIG. 8A presents a block diagram of a local controller at the optically switchable device in accordance with one embodiment.

FIG. 8A depicts an embodiment of control hardware, 800, located near the optically switchable device 801, and, e.g., far from laser source 805. The hardware decodes control information encoded upstream in a light beam 803 from a laser 805, e.g., a laser diode. The light energy in the light beam 803 may be captured by a fiber optic cable or otherwise directed to a beam splitter 807, which directs a fraction of the beam energy for conversion to electricity, e.g., using a photovoltaic cell 809. Cell 809 converts the energy of beam 803 to electrical energy used to power optical transitions in a switchable device such as an optically switchable device and/or to charge a storage device 811. As mentioned, the photovoltaic cell may rectify FM signal in the light beam to provide drive voltage controlled by the FM encoding.

A driver (upstream and not shown) modulates laser diode 805 in a manner that encodes control information into light beam 803. In some implementations, a large fraction of the beam energy is directed by splitter 807 to the optically switchable device. For example, at least about 70% or at least about 90% of the beam energy may be directed to the photovoltaic cell. This energy is used to drive the device optical transitions.

A fraction of beam 803 is directed by splitter 807 to a photonic to electronic converter 813, which may be a photodiode for example. The converter 813 converts the beam energy to an electrical signal containing the encoded control information. The electrical output of converter 813 may be in direct current form. It is used to instruct a communications circuit 815 such as an H-bridge, 820. Regardless of how it is implemented, communications circuit 815 decodes the information in beam 803 to control, e.g., the polarity of voltage and/or current applied to the optically switchable device. As indicated above, AC encoding may be used to control the polarity.

In certain embodiments, energy obtained from the beam 803 is used to drive transitions in an optically switchable device by an amplifier such as a pulse width modulation amplifier. In other embodiments, the transitions are driven by a voltage regulator such as a Buck converter. The Buck converter may be used to produce/control the magnitude of the voltage applied to the EC device. An H-bridge device may be used to control the polarity of the voltage applied to the EC device.

Because optically switchable devices often require only small amounts of power to maintain an end optical state (e.g., tinted or clear), the local electrical circuits may be quite simple. This allows much of the instructions for driving transitions to be encoded upstream, away from the device. Therefore, the cost of the control logic at the device location is relatively low. In various embodiments, the electronics associated with each optically switchable device is modest.

In one particular embodiment, photonic energy is modulated upstream by frequency modulation (FM). In some implementations, the duty cycle of the FM signal is controlled upstream. Different duty cycles correspond to different voltage magnitudes. For example, a 90% duty cycle may correspond to 3V applied to the switchable device, while a 10% duty cycle may correspond to a 0.3V applied to the device. Thus, the duty cycle of the frequency modulated signal controls the magnitude of the applied voltage. In some embodiments, a pulse width modulation amplifier is employed to control the duty cycle and hence the magnitude of the voltage applied to the optically switchable device.

Additional control information may be provided by amplitude modulation (AM) imposed on the light beam from the photonic source. In some embodiments, the amplitude modulation is superimposed on an FM signal. In one example, the polarity of the voltage applied to the switchable device may be controlled by the AM signal. At the switchable device, simple H-bridge can be used to control the polarity using information conveyed via amplitude modulation.

In one embodiment, the optically switchable device controller is configured to transmit status information from the device upstream to an enhanced laser driver (with additional circuitry to decode this information). The upstream driver is optionally configured to relay the information to a BMS. The status information may include voltages and currents applied to the optically switchable device, the current transmission state (in transition from state to state, tinted to 4%, 20%, clear, etc.), operational status of the device controls (fault codes and diagnostics), environmental conditions such as ambient temperature, and the like.

Figure 8B:
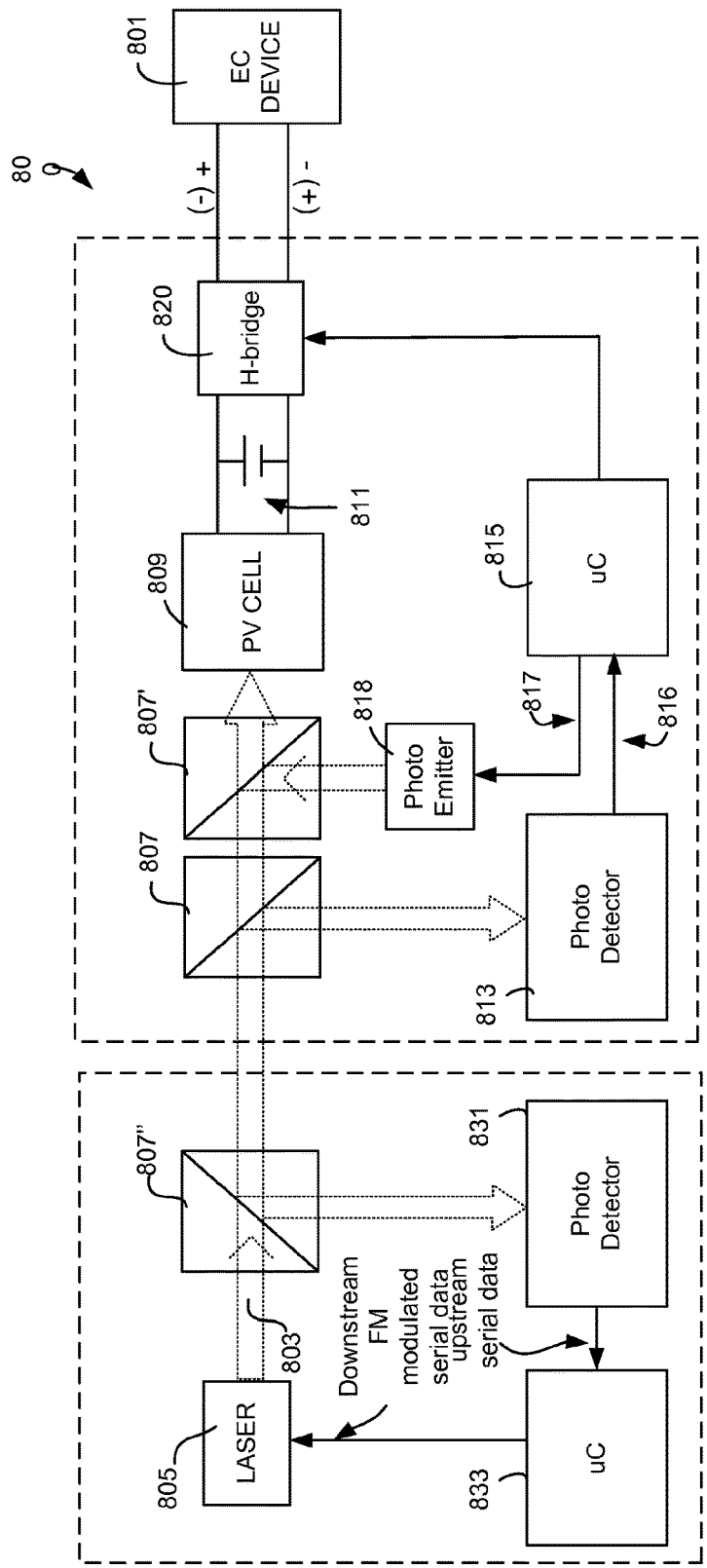
FIG. 8B presents a block diagram of an electrochromic window system that utilizes upstream data transfer in accordance with certain embodiments.

FIG. 8B presents an example of a system configured to transmit device information upstream. Many of the features of the system are shared with the simpler implementation depicted in FIG. 8A. In this example, local microcontroller 815 receives input from one or more local sensors. Microcontroller 815 then converts the sensed data to instructions for driving a photoemitter 818 to generate a light beam encoded with the sensor data. Photoemitter 818 can be a laser diode, a photo diode, etc. In certain embodiments, photoemitter 818 emits light at a wavelength that is substantially removed from the wavelength of light from laser 805. In some implementations, the microcontroller converts the sensed data into a serial data stream (ones and zeros). As an example, the CANOpen protocol may be used. Using such protocol, microcontroller 815 encrypts the photonically transmitted data. The photoemitter simply turns on or off in response to the encrypted serial data stream from the microcontroller. A similar approach may be used to generate the downstream data.

In the embodiment depicted in FIG. 8B, photoemitter 818 directs emitted light to a second beam splitter 807', which redirects the light upstream. In some embodiments, the emitted light is reflected from splitter 807' back to the same optical transmission means that delivered the downstream light. For example, the splitter reflects the signal into a bidirectional optical fiber. The bi-directional transmission may be implemented in a manner similar to that employed in optical communications, usually by choosing different wavelength laser diodes. For example the downstream transmission may be the high power amplitude modulated 850 nm laser, to deliver the necessary energy to drive the device transitions, and the upstream signal may be a 1310 nm diode laser. The beam splitters may be tuned for a wavelength (e.g., dichroic mirrors), or they may employ inserted filters, so that only the 1310 nm light reaches the upstream photodetector.

Upstream, an element receives and decodes the light emitted from photoemitter 818. In some designs, the upstream location employs an arrangement of components similar to that depicted in FIG. 8A. In the embodiment of FIG. 8B, a third beam splitter 807" receives the upstream optical signal and reflects it to a photodector 831, which outputs the unencoded data, in electrical form, to a microcontroller 833. Microcontroller 833 then decodes and otherwise processes the serial data stream. It may instruct the laser 805 based on the decoded data, or it may provide the decoded data to a master controller such as a BMS. In some cases, microcontroller 833 may be the same product employed in controller 815. Of course, the programming of these controllers may be specific for their roles in the system.

Figure 9:
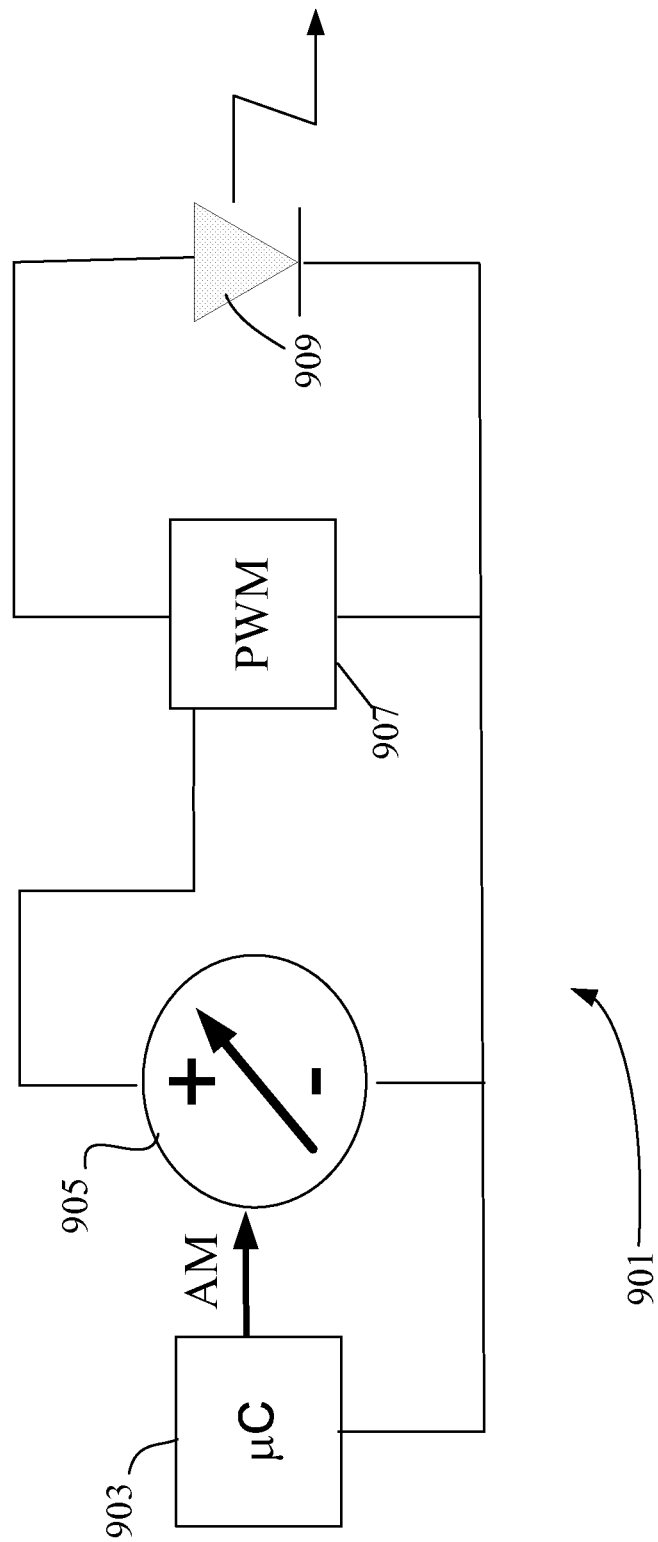
FIG. 9 presents a block diagram of an upstream controller for providing instructions to multiple downstream optically switchable devices in accordance with one embodiment.

FIG. 9 depicts an example of a driver circuit 901 that applies FM and AM signals to a light beam. The AM signal is generated by a microcontroller 903 and applied to a voltage controlled voltage source (VCVS) 905, which applies the encoded polarity information to the light beam. The VCVS may be implemented with a voltage regulator such as the LM317 voltage regulator from Fairchild Semiconductor of San Jose, Calif. Frequency modulation is applied via pulse width modulator (PWM) 907. The frequency and amplitude modulated signal is used to drive a diode laser 909. In some embodiments, the PWM is configured to apply varying duty cycle values to control the amplitude of the drive voltage/current applied to the switchable devices.

For periods of time when the sun is not shining and therefore not powering the laser diode or otherwise providing photonic energy for the optical transition, an alternative source of energy may be employed to power the transition. For example, the laser diode may be powered by electricity from the grid or a backup source in a building where the optically switchable devices reside. Alternatively, or in addition, the devices themselves may be powered by batteries or other storage devices located close to the windows, e.g., with the photovoltaic cells.

In certain embodiments, the photonic control information may be received from a building management system (BMS) or other high-level building controller for optically switchable devices. Examples of building level controllers and networks suitable for controlling all or many windows in a building are described in the following US Patents and Patent Applications, each incorporated herein by reference in its entirety: U.S. patent application Ser. No. 13/049,756, filed Mar. 16, 2011, and titled "MULTIPURPOSE CONTROLLER FOR MULTISTATE WINDOWS"; U.S. patent application Ser. No. 13/449,235, filed Apr. 17, 2012, and titled "CONTROLLING TRANSITIONS IN OPTICALLY SWITCHABLE DEVICES"; U.S. patent application Ser. No. 13/772,969, filed Feb. 21, 2013, and titled "CONTROL METHOD FOR TINTABLE WINDOWS"; and U.S. Pat. No. 8,213,074, titled "ONBOARD CONTROLLER FOR MULTISTATE WINDOWS."

In some embodiments, the photonic converter circuitry proximate the optically switchable device may be configured to receive remote control device signals that allow users in the locale of the device to turn the device off and on or otherwise control the device.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

The invention claimed is:

1. A system comprising:
   i) at least one electrochromic (EC) window;
   ii) an EC window controller configured to control tint states of the at least one EC window;
   iii) a photovoltaic (PV) power converter; and
   iv) an optical fiber; wherein:
   the PV power converter is configured to receive photonic energy by way of the optical fiber, convert the photonic energy to electricity and deliver at least a portion of the electricity to one or both of the EC window controller and the EC window.

2. The system of any of claims 1, wherein the PV power converter is positioned in a frame around the EC window or integrated, at least partially, within a secondary seal of the EC window.

3. The system of claim 1, wherein the light energy is supplied to the optical fiber from a diode laser.

4. The of claim 3, further comprising a controller for (i) receiving status information concerning the EC window, and (ii) encoding the status information for upstream transmission on the optical fiber.

5. The system of claim 3, wherein the diode laser is energized by a driver, the driver receiving power from a photovoltaic array and/or a low-voltage power line of less than about 30 volts.

6. The system of claim 5, wherein the photovoltaic array is positioned more than 1 meter from the EC window.

7. The system of claim 3, further comprising a controller for demodulating the light energy when the light energy received from the optical fiber is modulated.

8. The system of claim 7, wherein the controller is configured to decode frequency modulation in the light energy received from the optical fiber.

9. The system of claim 8, wherein the controller is configured to determine from the frequency modulation the magnitude of voltage or current to be applied to the EC window.

10. The system of claim 7, wherein the controller is configured to decode amplitude modulation in the light energy received from the optical fiber.

11. The system of claim 10, wherein the controller is configured to determine from the amplitude modulation the magnitude of voltage or current to be applied to the EC window.

12. The system of claim 10, wherein the controller is configured to determine from the amplitude modulation the polarity of voltage or current to be applied to the EC window.

13. The system of claim 12, wherein the controller comprises an H-bridge.

14. The system of claim 1, wherein the EC window controller is configured to receive control information by way of the optical fiber.

15. The system of claim 14, wherein the diode laser feeds to an optical cable, the optical cable running through a splitter, the splitter having a plurality of optical output fibers each configured to deliver control information to each of a plurality of EC window controllers.

16. The system of claim 15, wherein a plurality of EC window controllers are configured in a daisy chain format.

17. An insulated glass unit (IGU) spacer comprising a window controller of an electrochromic (EC) window and a photovoltaic (PV) power converter configured to receive photonic energy by way of an optical fiber, convert the photonic energy to electricity and deliver at least a portion of the electricity to the EC window controller.

18. The IGU spacer of claim 17, wherein the window controller is configured to demodulate the light energy when light energy received at the window controller is modulated.

19. The IGU spacer of claim 18, wherein the window controller is configured to decode amplitude modulation in the light energy received at the window controller.

20. The IGU spacer of claim 19, wherein the window controller is configured to determine from the amplitude modulation the polarity of voltage or current to be applied to an optically switchable window in contact with the IGU spacer.

21. An insulated glass unit (IGU) comprising an electrochromic (EC) window and a photovoltaic (PV) power converter configured to receive photonic energy by way of an optical fiber, convert the photonic energy to electricity and deliver at least a portion of the electricity to one or both of the EC window controller and the EC window.

22. The IGU of claim 21, wherein the PV power converter is positioned, at least partially, in a secondary seal of the IGU.

23. The IGU of claim 21, having no electrical wiring traversing a primary seal of the IGU.

24. An optically switchable device system comprising:
   i) an optically switchable device comprising bus bars;
   ii) a photovoltaic (PV) power converter configured to apply a voltage to the bus bars, wherein applying the voltage to the bus bars changes the optical state of the optically switchable device; and
   iii) an optical fiber; wherein:
   the PV power converter is configured to receive photonic energy by way of the optical fiber, convert the photonic energy to electricity and deliver at least a portion of the electricity to the optically switchable device.

25. The optically switchable device system of claim 24, further comprising a controller for (i) receiving status information concerning the optically switchable device, and (ii) encoding the status information for upstream transmission on the optical fiber.

26. The optically switchable device system of claim 24, wherein a plurality of optical fibers connected with a light source are configured to deliver photonic energy to each of a plurality of PV power converters coupled with each of a plurality of optically switchable devices.

27. The optically switchable device system of claim 26, further comprising an optically switchable device controller configured to independently control the voltage and/or current applied to each of a plurality of optically switchable devices.

28. The optically switchable device system of claim 24, further comprising an optically switchable device controller that defines the voltage and/or current applied to the bus bars by the PV power converter.

29. The optically switchable device system of claim 28, further comprising a splitter that splits light energy between a first path that delivers light energy to the PV power converter and a second path that delivers light energy to the optically switchable device controller.

30. The optically switchable device system of claim 28, wherein the optically switchable device controller is configured to demodulate light energy when light energy received at the optically switchable device controller is modulated.

31. The optically switchable device system of claim 30, wherein the optically switchable device controller is configured to decode frequency modulation in the light energy received at the optically switchable device controller.

32. The optically switchable device system of claim 30, wherein the optically switchable device controller is configured to decode amplitude modulation in the light energy received at the optically switchable device controller.

33. The optically switchable device system of claim 32, wherein the optically switchable device controller is configured to determine from the amplitude modulation the polarity of voltage or current to be applied to the optically switchable device.

\* \* \* \* \*